United States Patent
Zuniga-Pflucker et al.

(10) Patent No.: US 12,467,034 B2
(45) Date of Patent: Nov. 11, 2025

(54) METHOD FOR GENERATING CELLS OF THE T CELL LINEAGE

(71) Applicant: Sunnybrook Research Institute, Toronto (CA)

(72) Inventors: Juan Carlos Zuniga-Pflucker, Toronto (CA); Mahmood Mohtashami, Toronto (CA); Ashton Trotman-Grant, Toronto (CA)

(73) Assignee: Sunnybrook Research Institute, Toronto (CA)

( * ) Notice: Subject to any disclaimer, the term of this patent is extended or adjusted under 35 U.S.C. 154(b) by 838 days.

(21) Appl. No.: 16/969,854

(22) PCT Filed: Feb. 14, 2019

(86) PCT No.: PCT/CA2019/050181
§ 371 (c)(1),
(2) Date: Aug. 13, 2020

(87) PCT Pub. No.: WO2019/157597
PCT Pub. Date: Aug. 22, 2019

(65) Prior Publication Data
US 2020/0399599 A1 Dec. 24, 2020

Related U.S. Application Data

(60) Provisional application No. 62/630,497, filed on Feb. 14, 2018.

(51) Int. Cl.
*A61K 40/11* (2025.01)
*A61K 40/40* (2025.01)
*A61K 48/00* (2006.01)
*C12N 5/0783* (2010.01)

(52) U.S. Cl.
CPC ............ *C12N 5/0636* (2013.01); *A61K 40/11* (2025.01); *A61K 40/40* (2025.01); *A61K 2239/31* (2023.05); *A61K 2239/38* (2023.05); *C12N 2501/42* (2013.01); *C12N 2506/45* (2013.01)

(58) Field of Classification Search
CPC ... C12N 5/0636; C12N 2501/42; A61K 48/00
See application file for complete search history.

(56) References Cited

U.S. PATENT DOCUMENTS

| | | | |
|---|---|---|---|
| 7,575,925 | B2 | 8/2009 | Schmitt et al. |
| 8,772,028 | B2 * | 7/2014 | Zuniga-Pflucker .......................... C12N 5/0647 435/372.3 |
| 8,871,510 | B2 | 10/2014 | Spangrude et al. |
| 2004/0171148 | A1 | 9/2004 | Schmitt et al. |
| 2011/0236363 | A1 | 9/2011 | Chang et al. |
| 2016/0194607 | A1 | 7/2016 | Douay et al. |
| 2018/0155688 | A1 | 6/2018 | Seet et al. |

FOREIGN PATENT DOCUMENTS

| | | | |
|---|---|---|---|
| CA | 2790299 A1 | 8/2011 | |
| CA | 2479288 C | 2/2015 | |
| CN | 104053769 A | 9/2014 | |
| CN | 107429230 A | 12/2017 | |
| CN | 109312307 A | 2/2019 | |
| CN | 112041431 A | 12/2020 | |
| JP | 2006506322 A | 2/2006 | |
| JP | 2006517533 A | 7/2006 | |
| WO | 2003087159 A2 | 10/2003 | |
| WO | 2004064863 A1 | 8/2004 | |
| WO | WO-2007027226 A2 * | 3/2007 | ........... C12N 5/0636 |
| WO | 2016/055396 A1 | 4/2016 | |
| WO | 2017/173551 A1 | 10/2017 | |
| WO | 2017189705 A1 | 11/2017 | |
| WO | 2018146297 A1 | 8/2018 | |
| WO | 2022221962 A1 | 10/2022 | |
| WO | 2022241558 A1 | 11/2022 | |

OTHER PUBLICATIONS

Rassidakis, G. et al. Lack of c-kit (CD117) expression in CD30+ lymphomas and lymphomatoid papulosis. Mod Pathol 17, 946-953 (2004). https://doi.org/10.1038/modpathol.3800144 (Year: 2004).*
Gehre N. et al. A stromal cell free culture system generates mouse pro-T cells that can reconstitute T-cell compartments in vivo. Eur J Immunol. Mar. 2015;45(3):932-42. doi: 10.1002/eji.201444681. Epub Dec. 16, 2014. PMID: 25408420 (Year: 2014).*
Taqvi S. et al.Biomaterial-based notch signaling for the differentiation of hematopoietic stem cells into T cells. J Biomed Mater Res A. Dec. 1, 2006;79(3):689-97. doi: 10.1002/jbm.a.30916. Erratum in: J Biomed Mater Res A. Apr. 2007;81(1):257-8. PMID: 16845670 (Year: 2006).*
Taqvi, S., "Biomedical-based notch signaling for the differentiation of hematopoietic stem cells into T cells", Journal of Biomedical Materials Research, 2006, vol. 79, No. 3, p. 689-697, DOI: 10.1002/jbm.a.30916.
Office Action issued to corresponding Japanese Application No. 2020-543276, mailed Jan. 11, 2023.
Taqvi S. et al., "Biomaterial-based notch signaling for the differentiation of hematopoietic stem cells into T cells", Journal of Biomedical Materials Research Part A, Dec. 2006, vol. 79, No. 3, pp. 689-697.
Liu L. et al., "Identification of Domains for Efficient Notch Signaling Activity in Immobilized Notch Ligand Proteins", Journal of Cellular Biochemistry, Apr. 2017, vol. 118, No. 4, pp. 785-796.

(Continued)

*Primary Examiner* — Maria G Leavitt
*Assistant Examiner* — Vyoma Shubham Tiwari
(74) *Attorney, Agent, or Firm* — SMART & BIGGAR LP

(57) ABSTRACT

A method of generating cells of the T cell lineage is provided comprising (a) culturing a sample comprising stem cells or progenitor cells with a Notch ligand conjugated to a suspension support and (b) isolating cells of the T cell lineage. In one embodiment, the cells of the T-cell lineage are progenitor T cells or mature T cells. Compositions, kits and uses thereof are also provided.

5 Claims, 20 Drawing Sheets

(56) References Cited

OTHER PUBLICATIONS

Reimann C. et al., "Human T-Lymphoid Progenitors Generated in a Feeder-Cell-Free Delta-Like-4 Culture System Promote T-Cell Reconstitution in NOD/SCID/γc-/-Mice", Stem Cells, Aug. 2012, vol. 30, No. 8, pp. 1771-1780.
Shukla S. et al., "Progenitor T-cell differentiation from hematopoietic stem cells using Delta-like-4 and VCAM-1", Nature Methods, May 2017, vol. 14, No. 5, pp. 531-538.
Awong, G. et al., "Characterization in vitro and engraftment potential in vivo of human progenitor T cells generated from hematopoietic stem cells", Blood, Jul. 2009, vol. 114, No. 5, pp. 972-982.
Awong, G. et al., "Human proT-cells generated in vitro facilitate hematopoietic stem cell-derived T-lymphopoiesis in vivo and restore thymic architecture", Blood, Dec. 2013, vol. 122, No. 26, pp. 4210-4219.
D'Souza, B. et al., "Canonical and non-canonical Notch ligands", Curr Top Dev Biol. 2010, 92, pp. 73-129, doi:10.1016/S0070-2153(10)92003-6.
Ferrando, A. et al., "Gene expression signatures define novel oncogenic pathways in T cell acute lymphoblastic leukemia", Cancer Cell, Feb. 2002, vol. 1, pp. 75-87.
Gordon, W.R. et al., "Mechanical Allostery: Evidence for a Force Requirement in the Proteolytic Activation of Notch", Developmental Cell, Jun. 2015, vol. 33, pp. 729-736.
Kennedy, M. et al., "T Lymphocyte Potential Marks the Emergence of Definitive Hematopoietic Progenitors in Human Pluripotent Stem Cell Differentiation Cultures", Cell Reports 2, Dec. 2012, pp. 1722-1735.
Krenger, W. et al., "Thymic T-cell development in allogeneic stem cell transplantation", Blood, Jun. 2011, vol. 117, No. 25, pp. 6768-6776.
Legrand, N. et al., "Experimental models to study development and function of the human immune system in vivo" Journal of Immunology 2006, 176, pp. 2053-2058, doi: 10.4049/jimmunol.176.4.2053.
Meloty-Kapella, L. et al. "Notch ligand endocytosis generates mechanical pulling force dependent on dynamin, epsins, and actin" Developmental Cell, Jun. 2012, vol. 22, No. 6, pp. 1299-1312.
Porter, D.L. et al., "T-cell reconstitution and expansion after hematopoietic stem cell transplantation: 'T' it up!", Bone Marrow Transplantation, 2005, vol. 35, pp. 935-942.
Schmitt, T.M., et al., "Maintenance of T cell specification and differentiation requires recurrent notch receptor-ligand interactions", J Exp Med, Aug. 2004, vol. 200, No. 4, pp. 469-479.
Shah, D.K., et al., "An overview of the intrathymic intricacies of T cell development", Journal of Immunology, 2014, vol. 192, pp. 4017-4023.
Thompson, P.K., et al., "On becoming a T cell, a convergence of factors kick it up a Notch along the way", Seminars in Immunology 23, 2011, pp. 350-359.
Van den Brink, M.R., et al., "Strategies to enhance T-cell reconstitution in immunocompromised patients", Nat Rev Immunol, Nov. 2004, vol. 4, pp. 856-867.
Weng, A.P., et al., "Activating mutations of NOTCH1 in human T cell acute lymphoblastic leukemia", Science, Oct. 2004, vol. 306, pp. 269-271.
Zakrzewski, J.L., et al., "Adoptive transfer of T-cell precursors enhances T-cell reconstitution after allogeneic hematopoietic stem cell transplantation", Nat Med, Sep. 2006, vol. 12, No. 9, pp. 1039-1104.
Zakrzewski, J.L. et al., "Tumor immunotherapy across MHC barriers using allogeneic T-cell precursors", Nat Biotechnol, Apr. 2008, vol. 26, No. 4, pp. 453-461.
Zuniga-Pflucker, J.C., "T-cell development made simple", Nat Rev Immunol, Jan. 2004, vol. 4, pp. 67-72.
Dallas, M.H., et al., "Enhanced T-cell reconstitution by hematopoietic progenitors expanded ex vivo using the Notch ligan Delta1", Blood, Apr. 15, 2007, vol. 109, No. 8, pp. 3579-3588.
Gehre, N. et al., "A stromal cell free culture system generates mouse pro-T cells that can reconstitute T-cell compartments in vivo", Eur. J. Immunol. 2015, vol. 45, pp. 932-942.
Simons, L. et al., "Generation of adult human T-cell progenitors for immunotherapeutic applications", J. Allergy Clin. Immunol., Apr. 2018, vol. 141, No. 4, pp. 1491-1494.
Roh, K.-H., et al., "Engineering approaches for regeneration of T lymphopoiesis", Biomaterials Research, 2016, vol. 20, No. 20, pp. 1-10.
International Preliminary Report on Patentability mailed Aug. 27, 2020 in corresponding International Patent Application No. PCT/CA2019/050181.
Supplementary European Search Report mailed Oct. 21, 2021 in connection to EP Application No. 19754265.7.
Ashton C Trotman-Grant et al., DL4-µbeads induce T cell lineage differentiation from stem cells in a stromal cell-free system, Nat Commun, vol. 12, Aug. 18, 2021, pp. 1-11.
Jastaranpreet Singh et al., Producing proT cells to promote immunotherapies, International Immunology, vol. 30, Aug. 9, 2018, pp. 541-550.

* cited by examiner

A

B

FIGURE 10 con't.
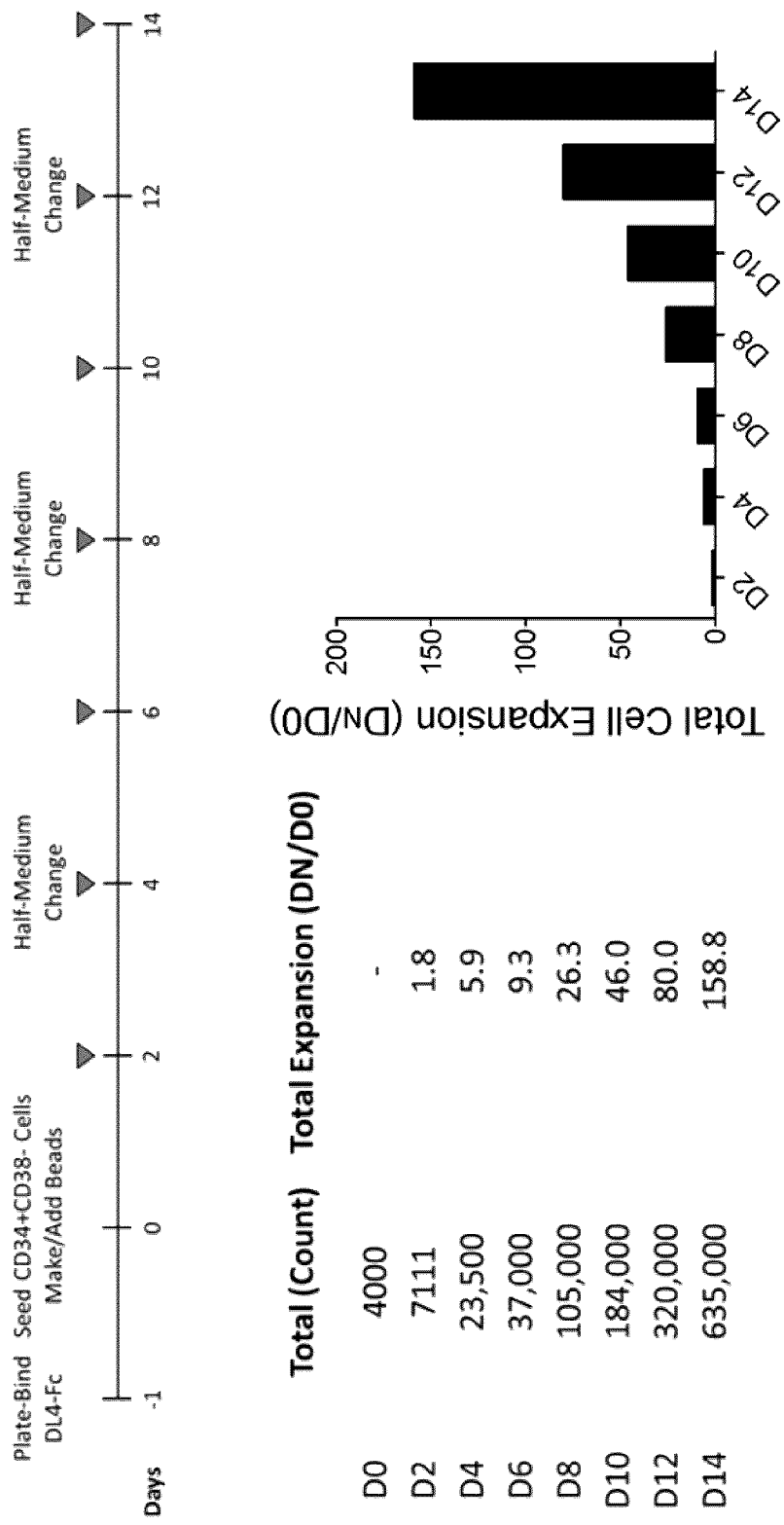

METHOD FOR GENERATING CELLS OF THE T CELL LINEAGE

CROSS-REFERENCE TO RELATED APPLICATION

This application is a national phase entry application of Patent Cooperation Treaty Application No. PCT/CA2019/050181, filed Feb. 14, 2019, which claims the benefit of priority to U.S. Provisional Application No. 62/630,497 filed Feb. 14, 2018, the contents of which are incorporated herein by reference in their entirety.

FIELD

The application relates to methods, compositions and kits for generating cells of the T cell lineage, and uses thereof. In particular, the application relates to methods, compositions and kits for generating progenitor and mature T cells, and uses thereof.

BACKGROUND

T cells are critical mediators of adaptive immunity and can be harnessed as therapeutic agents against pathogens and in cancer immunotherapy. Hematopoietic stem cell transplantation (HSCT) offers an effective treatment for a broad spectrum of malignant and non-malignant disorders, but the preconditioning regimens required before treatment results in an extended delay in T cell recovery (Krenger et al., 2011). In contrast to most other hematopoietic lineages, which develop in the bone marrow (BM), T cell development requires the migration of BM-derived progenitors to the thymus, wherein the incoming lymphocyte progenitors receive critical signals to induce their differentiation into T-lineage cells (Shah and Zuniga-Pflucker, 2014).

A key signal that is delivered to the incoming lymphocyte progenitors by the thymus stromal cells is mediated by the Notch ligand Delta-like-4, which is expressed by cortical thymic epithelial cells (Thompson and Zuniga-Pflucker, 2011). Notch receptors expressed by lymphocyte progenitors require a mechanical pulling force that is induced by Delta-like-4 bearing cells in order for Notch receptor activation to be effectively induced (D'Souza et al., 2010; Gordon et al., 2015; Meloty-Kapella et al., 2012). Additionally, T cell development has been shown to require constant and high levels of Notch receptor activation (Schmitt et al., 2004). In the absence of Notch1 receptor signals or Delta-like-4 induced signals, T cell development does not occur in the thymus, rather alternative lymphocyte lineages, such as B cells, develop instead. Thus, intrathymic T cell development is predicated on the Notch signaling pathway (Zuniga-Pflucker, 2004).

In the context of HSCT, thymus dysfunction or atrophy, as a result of conditioning and aging, respectively, combined with a limited capacity of transplanted HSCs to give rise to lymphocytes restrain the extent of T cell development in the thymus (Porter and June, 2005). This leads to inadequate immune surveillance, predisposing patients to infections and/or relapse of cancer and remains a serious clinical challenge.

The adoptive transfer of progenitor T (proT) cells has emerged as a promising strategy for enhancing T cell reconstitution, as human or mouse proT cells have been shown to engraft the thymus of immunodeficient mice despite their xenogeneic or allogeneic origin (Awong et al., 2009; Awong et al., 2013; Zakrzewski et al., 2006; Zakrzewski et al., 2008). ProT cells are developmentally immature and undergo positive and negative selection in the host thymus. Thus, they become restricted to the recipient's major histocompatibility complex (MHC) yielding host tolerant T cells that can bypass the clinical challenges associated with graft-versus-host disease (GVHD). Importantly, engraftment with proT cells restores the thymic architecture and improves subsequent thymic seeding by HSC-derived progenitors. In addition to its intrinsic regenerative medicine properties, proT cells can also be engineered with T cell receptors (TCRs) and chimeric antigen receptors (CARs) to confer specificity to tumor-associated antigens (TAA) to treat cancer and also with synthetic gene circuits to sculpt custom response programs.

An unmet challenge in the field is the development of a clinically relevant system that could be easily scaled up to generate large quantities of proT cells from different sources of human hematopoietic stem/progenitor cells (HSPC). Previous methods have relied on mouse-derived OP9 cells expressing the Notch ligands Delta-like-1 (DL1) or Delta-like-4 (DL4), however, this approach presents several challenges for clinical translation (Awong et al., 2009; Awong et al., 2013). Most strategies for a stromal cell-free approach have relied on a two-dimensional (2D) tissue culture platform, whereby Notch ligands, DL1 or DL4, are immobilized onto tissue-culture plates (Gehre et al., 2015; Reimann et al., 2012; Simons et al., 2017). Additional adhesion receptor ligands, like vascular cell adhesion molecule-1 (VCAM-1), have also been included in this format (Shukla et al., 2017). Human proT cells produced using these strategies have been shown to successfully reconstitute the thymus of immunodeficient mice. While the progress is encouraging, the utility of these approaches to generate proT cells for therapy is limited due to the need for scale-up processing for clinical manufacture and not an effective method for routine generation of large-scale cell numbers to be clinically applicable. Ideally, a truly scalable platform would allow for proT cells to be grown in closed automated bioreactor systems (Lipsitz et al., 2016).

SUMMARY

The inventors have developed a cell-free, bead-based system for generating cells of the T cell lineage from mouse or human hematopoietic stem/progenitor cells (HSPCs) and induced pluripotent stem cells (iPSCs). Non-plate-bound suspensions of Notch ligands (for example DL4-µbeads) allow for the effective generation of T-lineage cells including progenitor T cells and mature T cells.

Accordingly, the disclosure provides a method of generating a cell of the T cell lineage comprising (a) culturing a sample comprising stem cells or progenitor cells with a Notch ligand conjugated to a suspension support and (b) isolating cells of the T cell lineage.

In one embodiment, the suspension support is a particle.

In another embodiment, the suspension support is a microbead.

In one embodiment, the stem cells or progenitor cells with the Notch ligand are cultured in suspension.

In another embodiment, the stem cells are selected from hematopoietic stem/progenitor cells (HSPCs), embryonic stem cells or induced pluripotent stem cells (iPSCs).

In another embodiment, the stem cells are human stem cells, optionally $CD34^+$ or $CD34^+CD38^{-/lo}$ HSPCs.

In another embodiment, the stem cells are $CD34^+$ hematopoietic precursor cells, optionally $CD34^+$ hematopoietic precursor cells that have been differentiated from iPSCs.

In another embodiment, the Notch ligand is DL1 or DL4.

In another embodiment, the cells of the T cell lineage are progenitor T (proT) cells.

In another embodiment, the stem cells or progenitor cells are human cells and the proT cells have the phenotype $CD34^+CD7^+$ or $CD7^+CD5^+CD1a^-$.

In another embodiment, the stem cells or progenitor cells are mouse cells, optionally lineage$^-$ $CD117^+Sca-1^+$ mouse cells, and the proT cells have the phenotype $CD25^+$ or $CD25^+CD90^+$.

In another embodiment, the cells of the T-cell lineage are $CD4^+CD8^+$ double positive cells, $CD4^+CD8^+CD3^+$ double positive cells, $CD8^+CD3^+$ single positive cells or $CD4^+CD3^+$ single positive cells.

In another embodiment, the stem cells or progenitor cells are cultured in stromal cell-free media.

In another embodiment, the stem cells or progenitor cells are cultured with at least one T cell co-stimulatory molecule attached to a suspension support, optionally wherein the at least one T cell co-stimulatory molecule is VCAM1.

The disclosure also provides a cell of the T cell lineage, wherein the cell is generated by a method comprising: (a) culturing a sample comprising stem cells or progenitor cells with a Notch ligand conjugated to a suspension support and (b) isolating cells of the T cell lineage.

In one embodiment, the cell is a progenitor T cell, $CD4^+CD8^+$ double positive cell, $CD4^+CD8^+CD3^+$ double positive cell or $CD8^+CD3^+$ single positive cell, $CD4^+CD3^+$ single positive cell.

The disclosure also provides a suspension Notch ligand comprising (a) a Notch ligand and (b) a suspension support, optionally a microbead, wherein the Notch ligand is conjugated to the suspension support.

In one embodiment, the suspension support is a microbead and (i) the microbead has a diameter of 6.5 to 100 µm, optionally 20 to 30 µm, and/or (ii) the C-terminus region of the Notch ligand is conjugated to the microbead.

The disclosure also provides a use of the suspension Notch ligand for generating cells of the T cell lineage.

The disclosure also provides a kit comprising (i) a suspension Notch ligand comprising (a) a Notch ligand and (b) a suspension support, wherein the Notch ligand is conjugated to the suspension support and (ii) instructions for use of the suspension Notch ligand for generating cells of the T cell lineage.

The disclosure further provides a kit comprising (i) a suspension Notch ligand comprising (a) a Notch ligand and (b) a suspension support, wherein the Notch ligand is conjugated to the suspension support and (ii) a culture medium.

In one embodiment of the kit, the suspension Notch ligand comprises DL4 conjugated to a microbead.

In another embodiment, the kit further comprises (iii) at least one T cell co-stimulatory molecule attached to a suspension support, optionally wherein the at least one T cell co-stimulatory molecule is VCAM1.

The disclosure further provides a method of treating a subject having a condition requiring an increase in the number of T cells comprising:
(i) generating cells of the T cell lineage comprising (a) culturing a sample comprising stem cells or progenitor cells with a Notch ligand conjugated to a suspension support and (b) isolating cells of the T cell lineage, and
(ii) administering an effective amount of the cells of the T cell lineage to the subject.

In one embodiment, the cells of the T cell lineage are progenitor T cells.

In another embodiment, the cells of the T cell lineage are mature T cells.

In another embodiment, the cells of the T cell lineage are CD4+CD8+ double positive cells, CD4+CD8+CD3+ double positive cells, CD8+CD3+ single positive cells or CD4+CD3+ single positive cells.

Other features and advantages of the present application will become apparent from the following detailed description. It should be understood, however, that the detailed description and the specific examples while indicating preferred embodiments of the application are given by way of illustration only, since various changes and modifications within the spirit and scope of the application will become apparent to those skilled in the art from this detailed description.

BRIEF DESCRIPTION OF THE DRAWINGS

Embodiments of the invention will now be described in relation to the drawings in which.

N1Cluc cells. Plate-bound (PB) IgG and DL4-Fc were included as negative and positive controls, respectively. The number of beads in each condition presented in aggregate, the same surface area and therefore, the same total number of DL4-Fc molecules. 24 h after plating, the cells were lysed and analyzed for luciferase activity.

Figure 7:
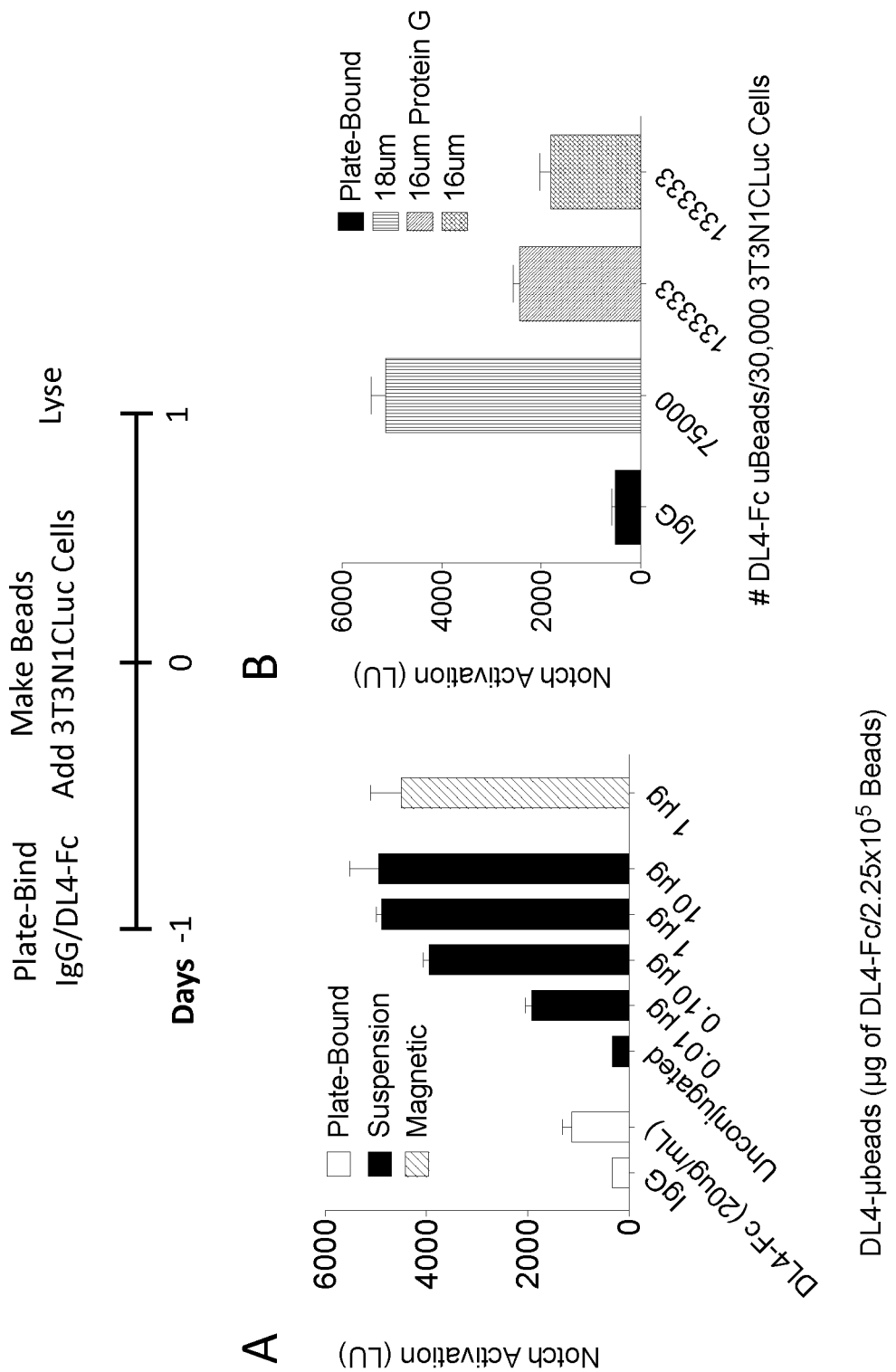

FIG. 7 shows Notch activation induced by DL4-Fc at varying concentrations and different composition of μbeads. A) DL4-μbeads were prepared by conjugating increasing amounts of DL4-Fc to a constant number of 25 μm diameter SA-coated μbeads. Magnetic μbeads of 25 μm diameter were included to evaluate the effect changing the core composition of the μbeads would have on their ability to activate Notch. B) Biotinylated DL4-Fc was bound to SA-μbeads or protein-G-μbeads of equal size to determine whether binding to Fc region is equally effective at activating Notch. DL4-μbeads were incubated overnight with $3 \times 10^4$ 3T3-N1Cluc cells. Plate-bound IgG was included as negative control. 24 h after plating, the cells were lysed and analyzed for luciferase activity.

Figure 8:
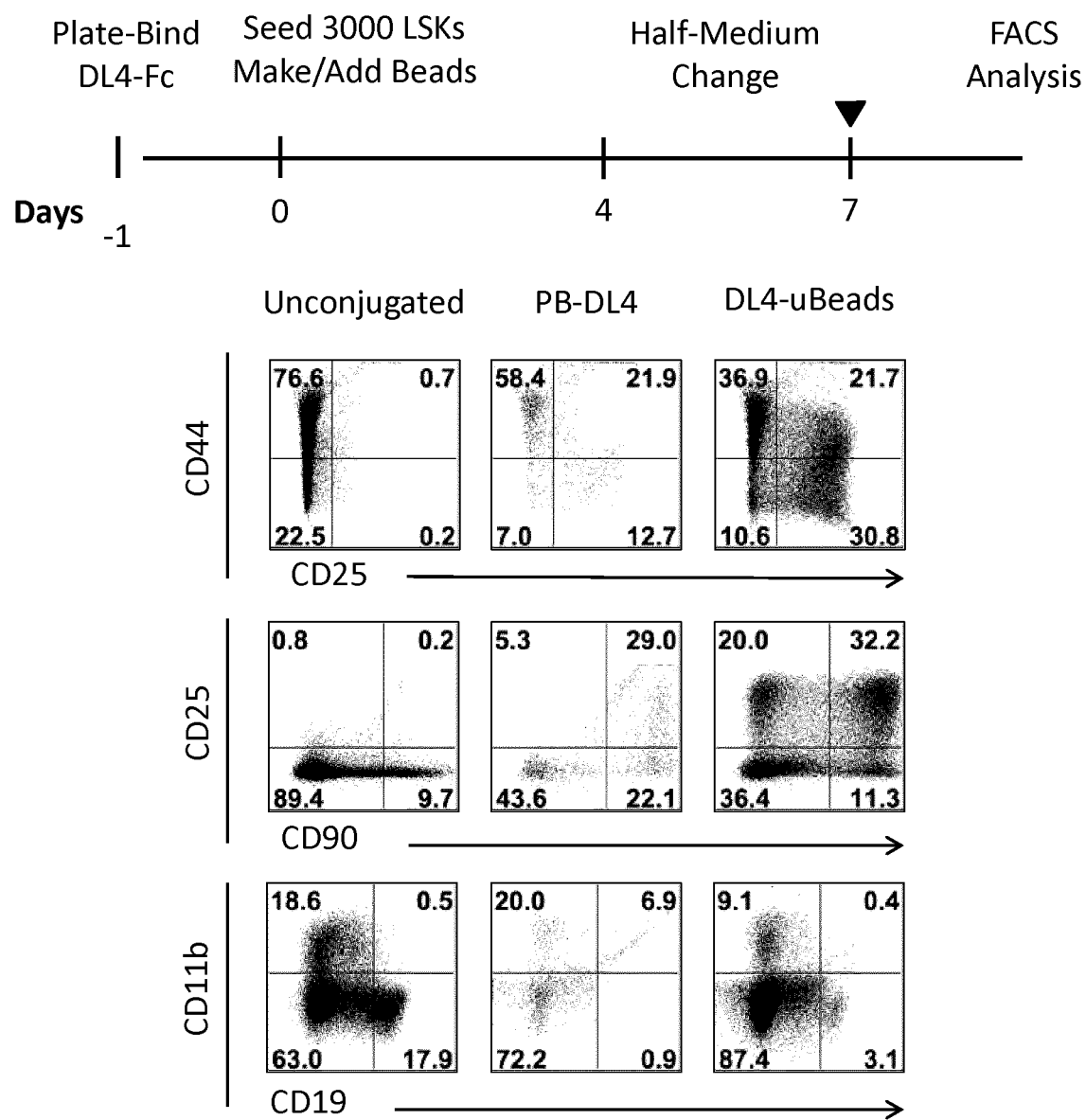

FIG. 8 shows induction of T cell development from mouse HSPCs using $2^{nd}$ generation DL4-μbeads. $1 \times 10^3$, $3 \times 10^3$ or $8 \times 10^3$ mouse fetal liver derived HSPCs were incubated for 7 days with unconjugated μbeads or DL4-μbeads at ratio of 10:1 (beads:cell) with media containing FBS, SCF, IL-7 and Flt3-L. Co-cultures were harvested and analyzed for the presence of T-lineage (CD25$^+$), B-lineage (CD19$^+$), or myeloid (CD11b$^+$) cells using flow cytometry. Numbers in plots indicate percentage of cells within each quadrant.

Figure 9:
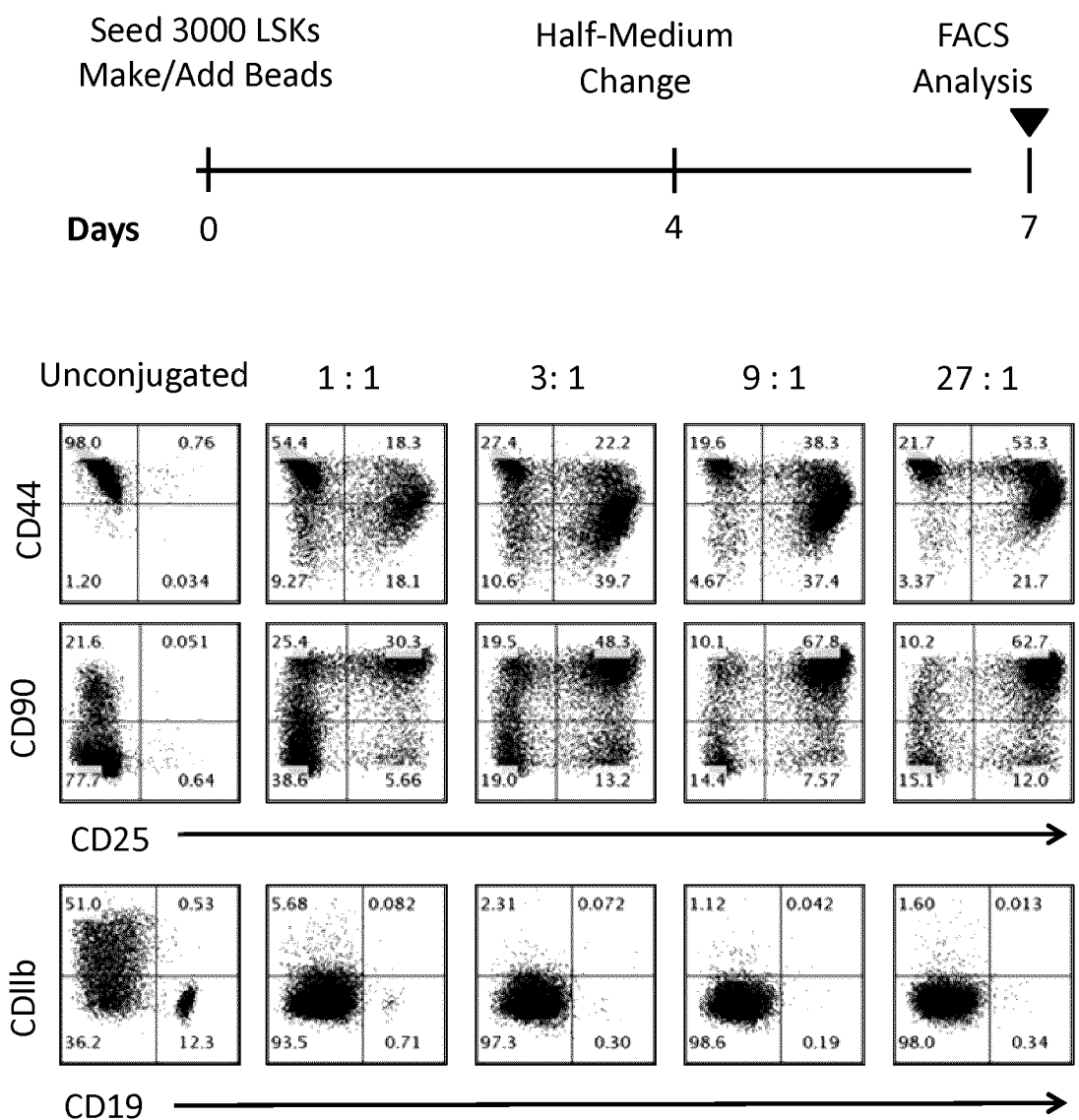

FIG. 9 shows optimization of HSPC to DL4-μbeads ratio. Mouse fetal liver derived HSPCs were cultured for 7 days in the following conditions: unconjugated μbeads, plate-bound DL4-Fc (PB-DL4), or 3-fold titration of DL4-μbeads. Cultures were analyzed for the inhibition of CD11b$^+$ myeloid and CD19$^+$ B-lineage cells and the emergence of proT (CD90$^+$ CD25$^+$) cells using flow cytometry.

Figure 10:
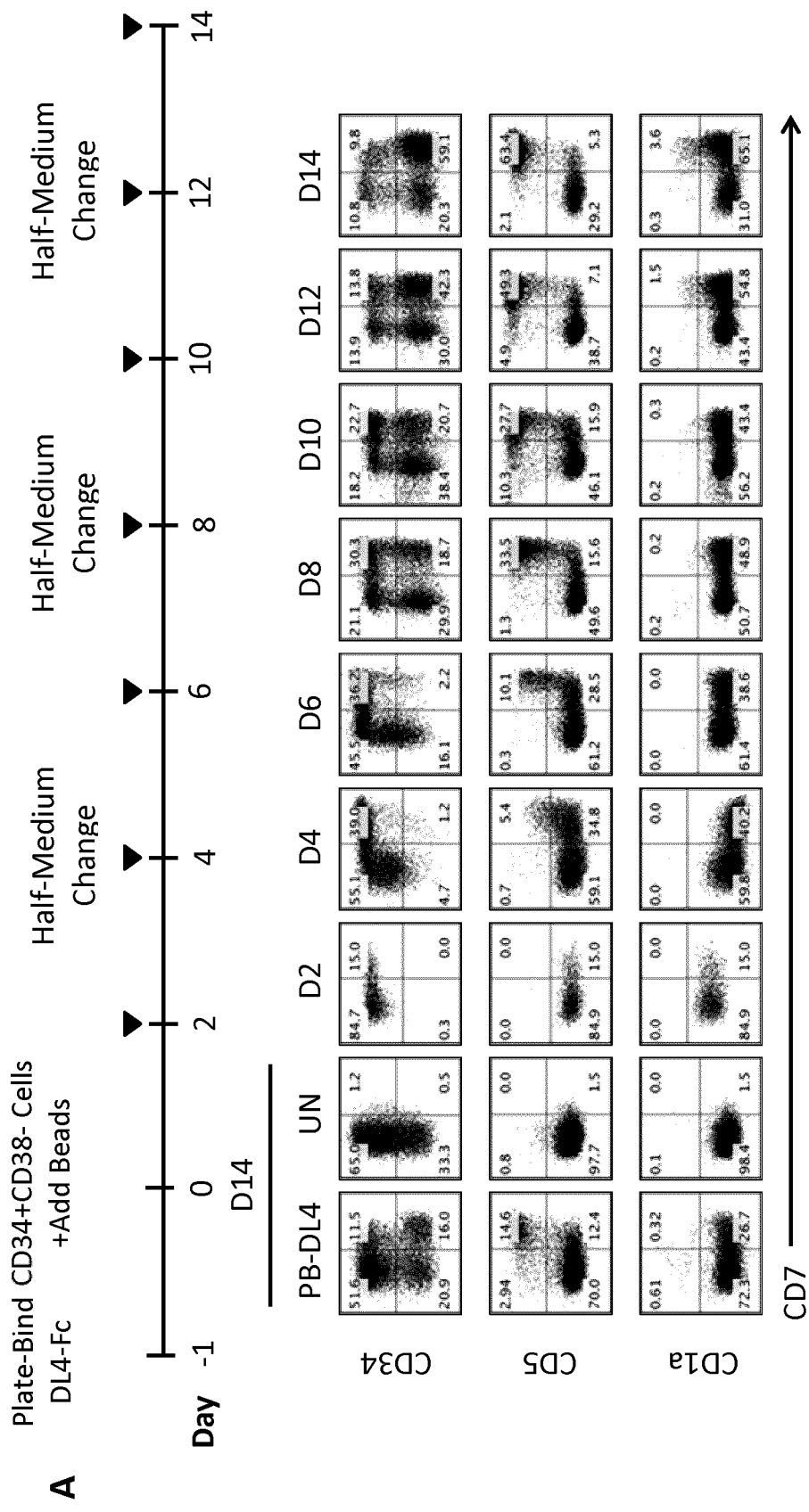

FIG. 10 shows the developmental progression of human T-lineage cells from HSPCs co-cultured with DL4-μbeads. A) Human cord blood-derived CD34$^+$ cells were cultured for 14 days with unconjugated μbeads, plate-bound DL4-Fc or DL4-μbeads in StemSpan™ SFEM II supplemented with StemSpan™ T Cell Progenitor Expansion Supplement. Every 2 days (arrowheads) cells were harvested and analyzed for the surface expression of CD34, CD5, CD1a and CD7 using flow cytometry. B) Cells were also counted to assess total cell expansion. Fold expansion was calculated by dividing the total count on the indicated day by the initial seeding amount at the star of the culture on day 0.

Figure 11:
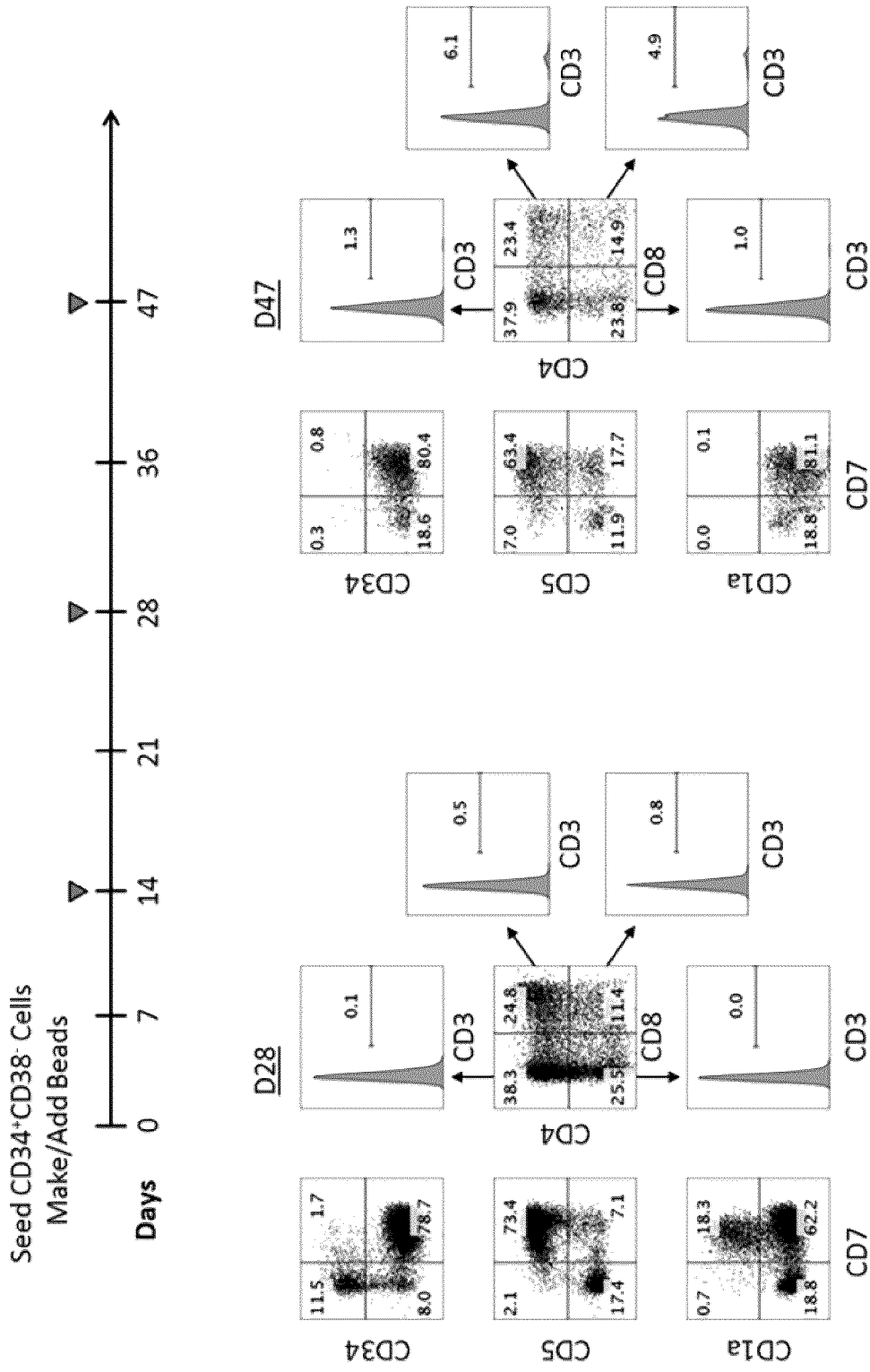

FIG. 11 shows analysis for the presence of mature human T cells generated with DL4-μbeads. Human cord blood-derived CD34$^+$ cells were cultured with DL4-μbeads in StemSpan™ SFEM II supplemented with StemSpan™ T Cell Progenitor Expansion Supplement. On days 28 and 47, cells were harvested and analyzed for the surface expression of CD34, CD5, CD1a, CD4, CD8 and CD3. Co-expression of CD3 is shown for either SP-gated cells, DP-gated cells or DN-gated cells, as indicated by arrows.

Figure 12:
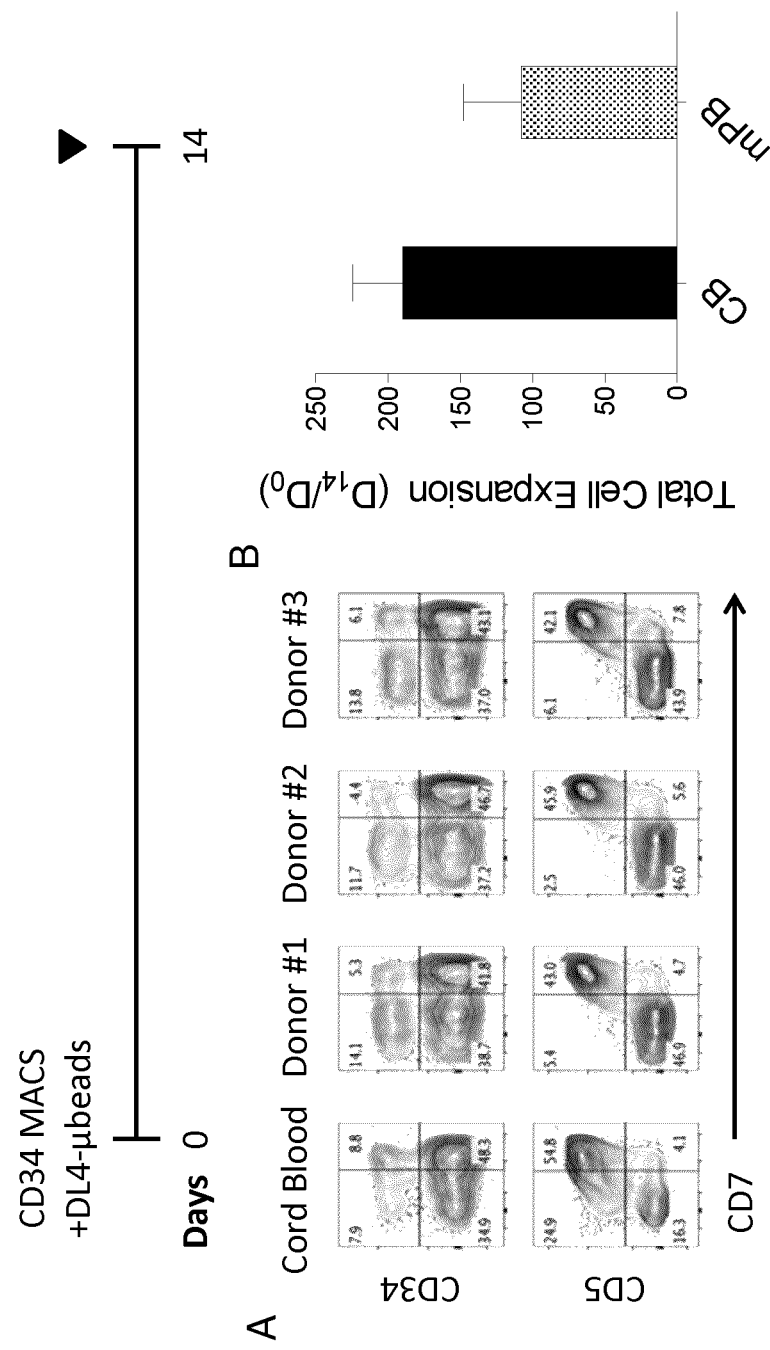

FIG. 12 shows DL4-μbeads induce the development of T cells from CD34$^+$ cells derived from G-CSF and Plerixafor (PLX) mobilized peripheral blood (mPB). $3 \times 10^3$ CD34$^+$ cells, derived from cord blood and adult humans (n=3) treated with G-CSF and PLX for 5 days, were incubated with 9,000 DL4-μbeads. A) Progression towards T cell development was analyzed for the expression of cell surface markers CD5, CD7 and CD34 using flow cytometry on day 14. B) Cell counts were done on day 14 using a hemocytometer and the fold expansion were calculated based on the starting cell numbers. Expansion rate using cord blood (CB) was used as a comparator.

Figure 13:
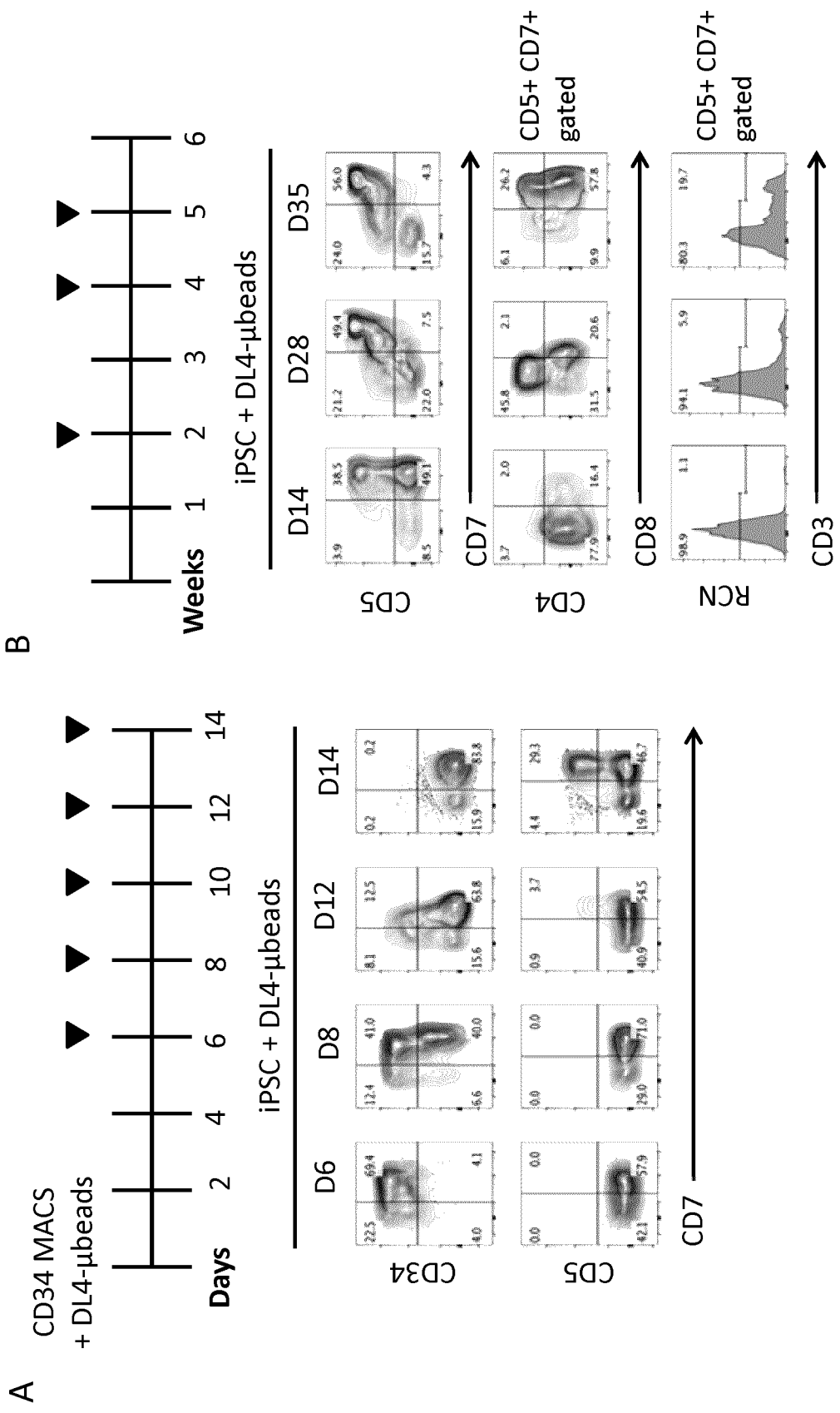

FIG. 13 shows early and late induction of T cell generation from induced pluripotent Stem cells (iPSCs) using DL4-μbeads. Human iPSCs were first induced to differentiate to the mesoderm fate and then to a CD34$^+$ pre-hematopoietic fate. (A) $3 \times 10^3$ MACS-enriched CD34$^+$ cells were incubated with $27 \times 10^3$ DL4-μbeads and their progression towards T cell development was analyzed using flow cytometry on days 6, 8, 10, and 12, for the cell surface expression of CD5, CD7 and CD34. B) Cultures from D14, D28 and D35 were analyzed for the presence of mature T cells using cell surface markers for T cell co-receptors CD4 and CD8, as well as CD3. Inverted triangles signify the days of analysis. RCN; relative cell number.

Figure 14:
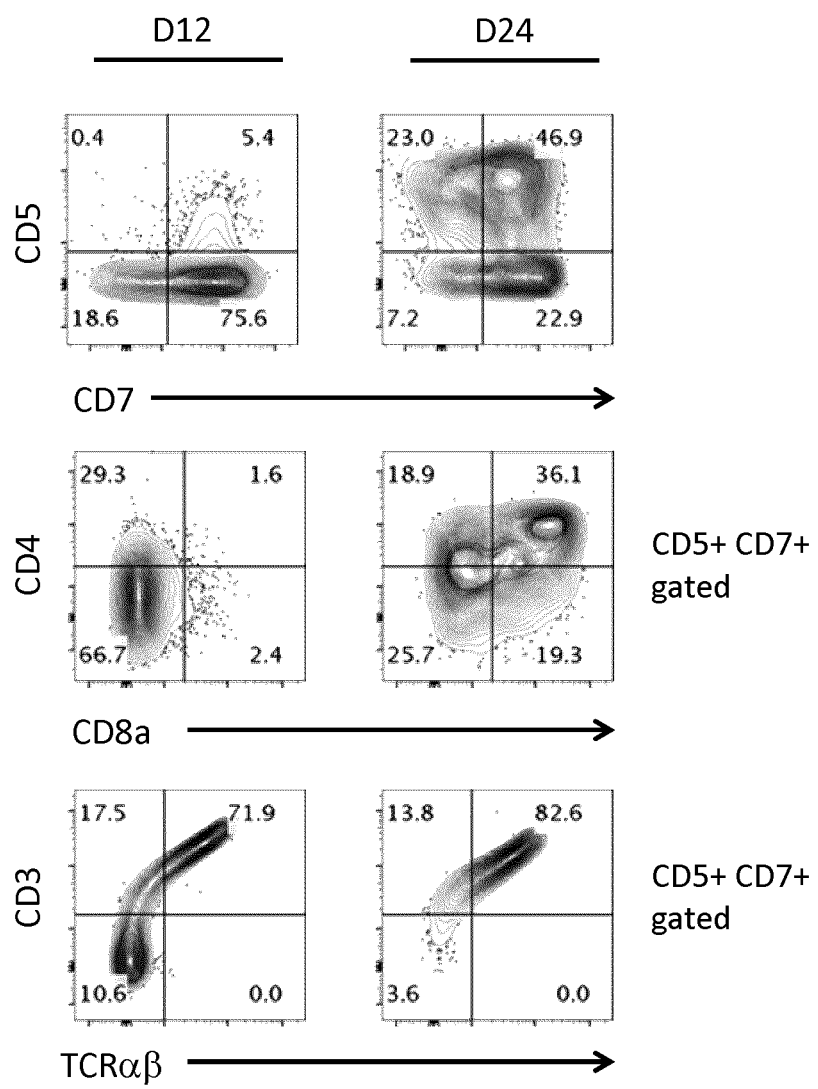

FIG. 14 shows early and late induction of T cell generation from T cell-derived iPSCs (T-iPSC). T-iPSCs were induced to mesoderm and then pre-hematopoietic fate. $3 \times 10^3$ MACS-enriched CD34$^+$ cells were incubated with $27 \times 10^3$ DL4-μbeads and their progression towards T cell development was analyzed using flow cytometry on days 12 (D12) and 24 (D24) for the cell surface expression of CD5, CD7 (early T cell development) and CD4, CD8, CD3 and TCRαβ (late T cell development).

Figure 15:
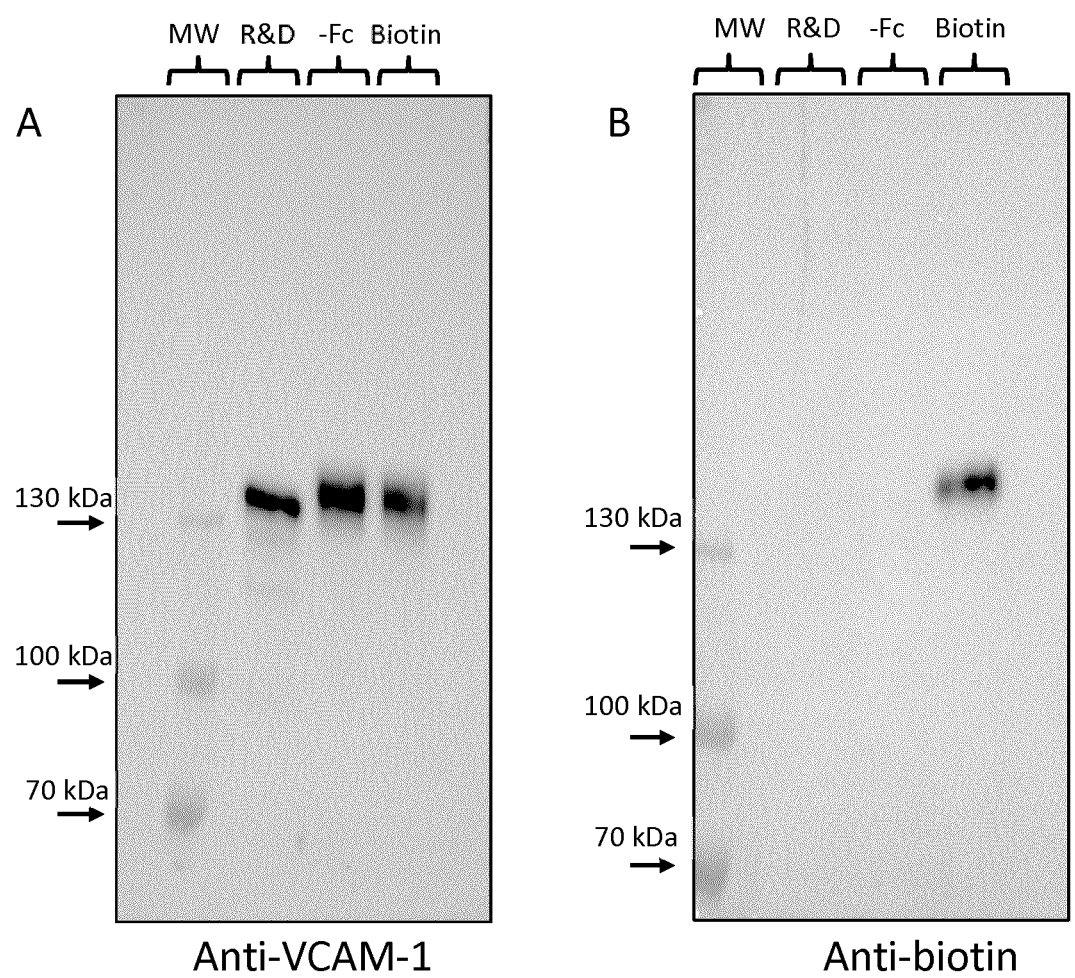

FIG. 15 shows biotinylation of recombinant VCAM1-Fc. Recombinant VCAM1-Fc was genetically engineered consisting of VCAM-1 extracellular domain, the IgG3 Fc domain and Avi-tag biotinylation site, similar to DL4-Fc. VCAM1-Fc was expressed in HEK293T cells, secreted into the media and subsequently purified using protein G conjugated beads and biotinylated in vitro using the BirA enzyme. Samples from commercially available VCAM1-Fc available from R&D Systems (R&D), lab-purified VCAM1-Fc (–Fc) band in vitro-biotinylated VCAM1-Fc (Biotin) were electrophoresed in a polyacrylamide gel. Using Western immunoblot analyses, A) the size and concentration of VCAM-Fc samples were compared to each other with anti-VCAM-1 antibody and B) the presence of biotinylated protein was detected with anti-biotin antibody.

Figure 16:
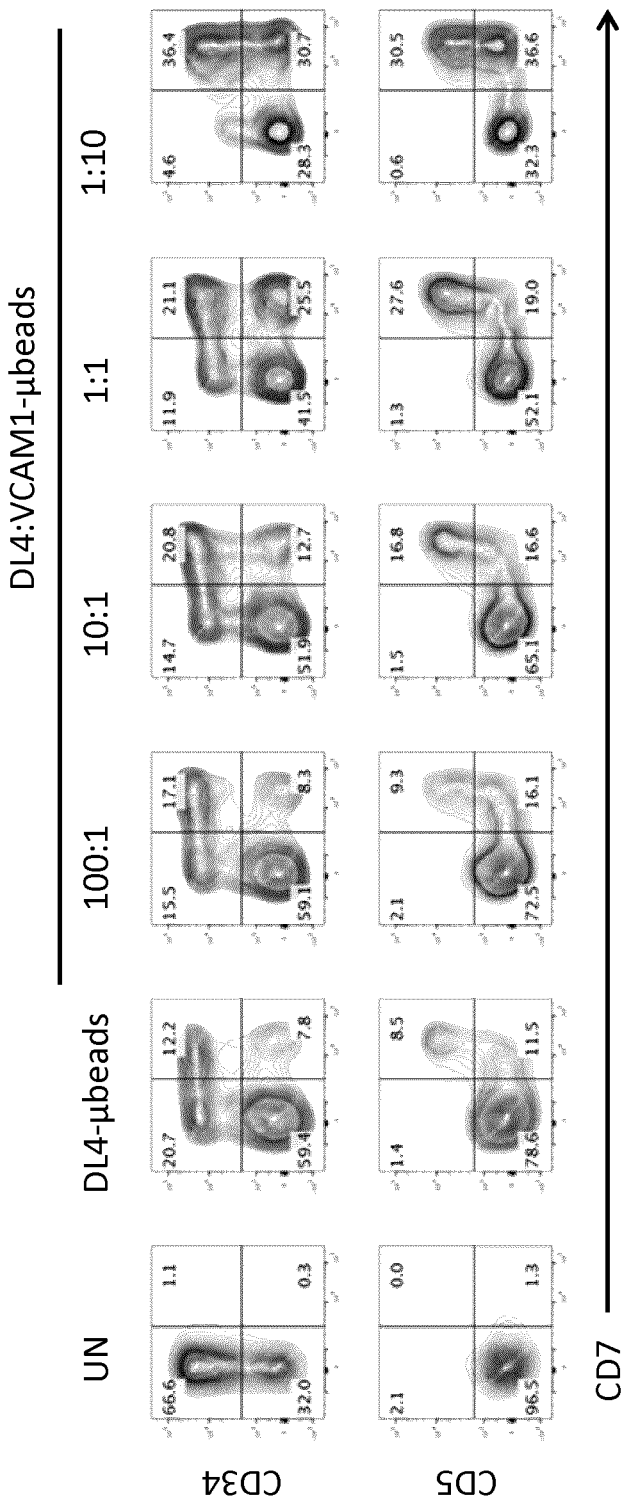

FIG. 16 shows the compound effect of VCAM-1 and DL4 on human T cell development. Biotinylated VCAM1-Fc (VCAM) was bound to μbeads at different ratios along with DL4-Fc (DL4), as indicated, and compared to unconjugated μbeads (UN) and DL4-μbeads. DL4-Fc amount was kept constant at 1 μg/2×10$^5$ SA-μbeads, while VCAM-Fc was added at 0.01 μg (for 100:1), 0.1 μg (for 10:1), 1 μg (for 1:1) and 10 μg (for 1:10). The DL4:VCAM1-μbeads were then incubated with $3 \times 10^3$ CB-derived CD34$^+$ cells and analyzed on D7 for progression in T cell development with CD34, CD7 and CD5 cells surface markers.

Figure 17:
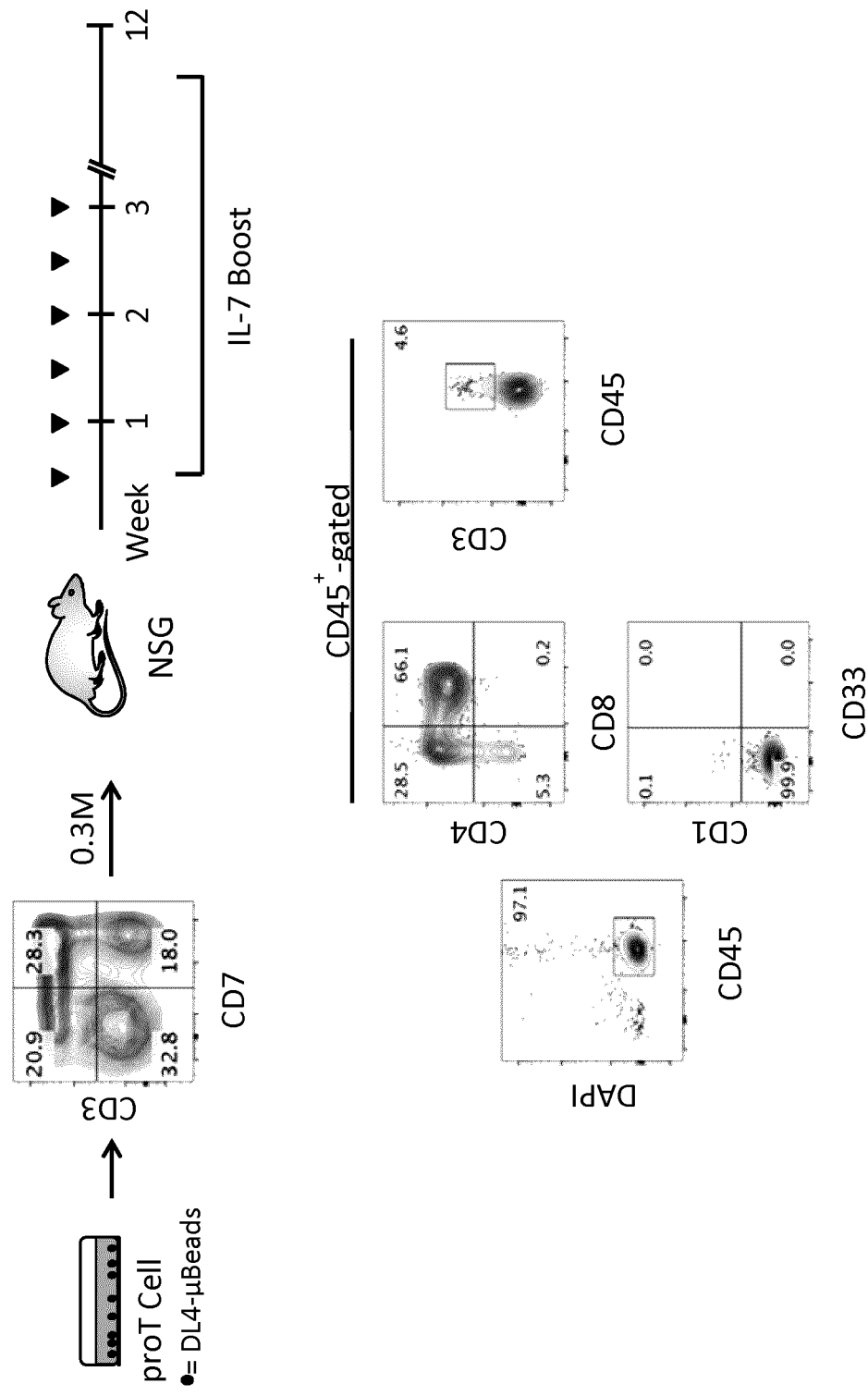

FIG. 17 shows the engraftment of progenitor T (proT) cells into the thymus of immunodeficient NOD-SCID IL2rγ$^{null}$ (NSG) mice. CD34$^+$ cells derived from human CB were incubated with DL4-μbeads for 7 days. CD34$^+$CD7$^+$ progenitor T (proT) cells were sorted using flow cytometry and $3 \times 10^5$ were intravenously injected into immunodeficient NSG mice. As depicted, IL-7 injection boosts were given at 3-4 day intervals. After 3 weeks, thymus was harvested and processed. Using flow cytometry analysis, live (DAPI$^-$) human hematopoietic cells (CD45$^+$) were identified. In addition, lineage analysis was done on electronically-gated live CD45$^+$ cells using the cell surface markers CD19 (B cells), CD33 (myeloid cells), CD3, CD4 and CD8 (T cells).

Figure 18:
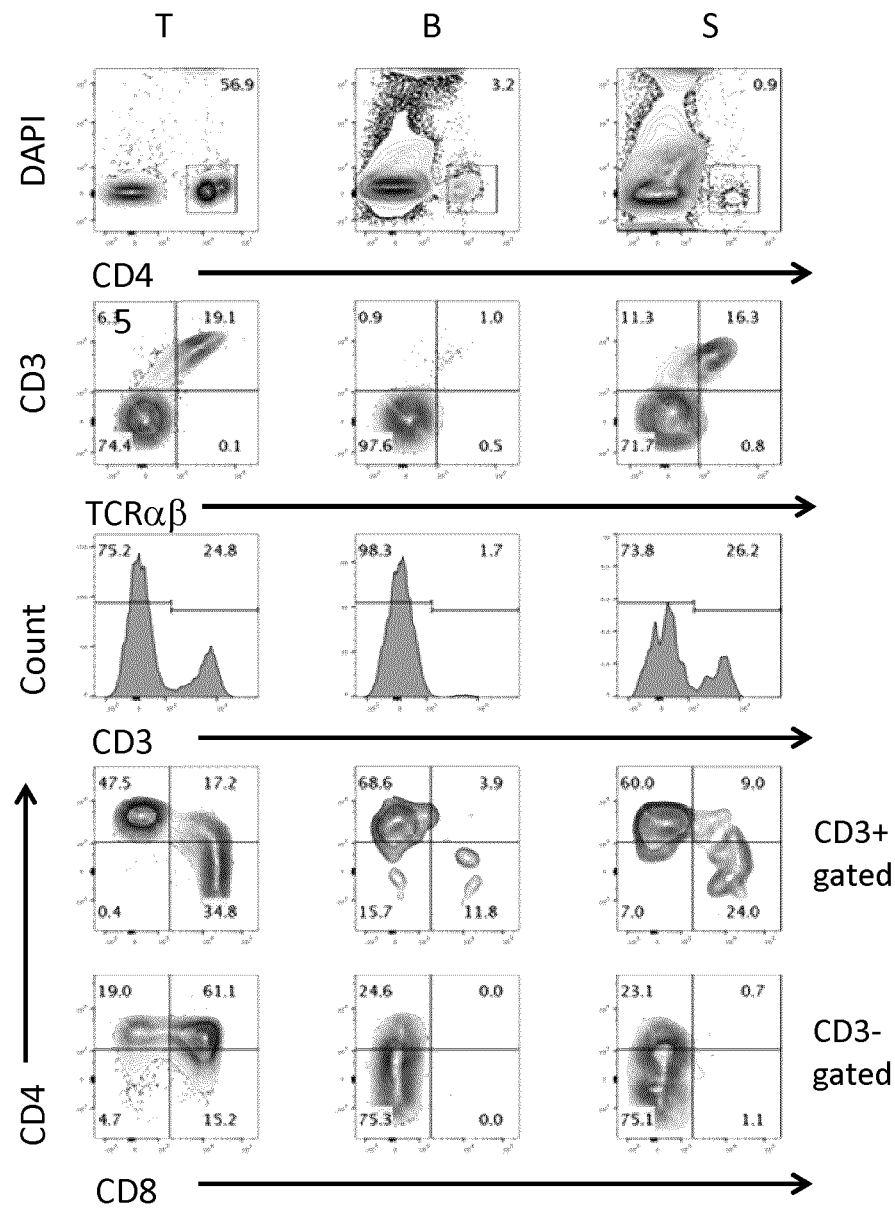

FIG. 18 shows the engraftment of proT cells into thymus and their subsequent migration into bone marrow and secondary lymphoid organ, spleen. ProT cells, sorted from D7

CB-HSPC/DL4-µbead cultures, were injected into NSG mice. 12 weeks after injection, the thymus (T), bone marrow (BM) and spleen (S) were harvested and processed in order to assess the engraftment of CD45+ human hematopoietic cells using flow cytometry (top panel). By electronically gating on the human CD45+ cells, the presence of mature T cells was determined using cell surface markers CD3, CD4, CD8 and TCRαβ for each organ, as indicated.

Figure 19:
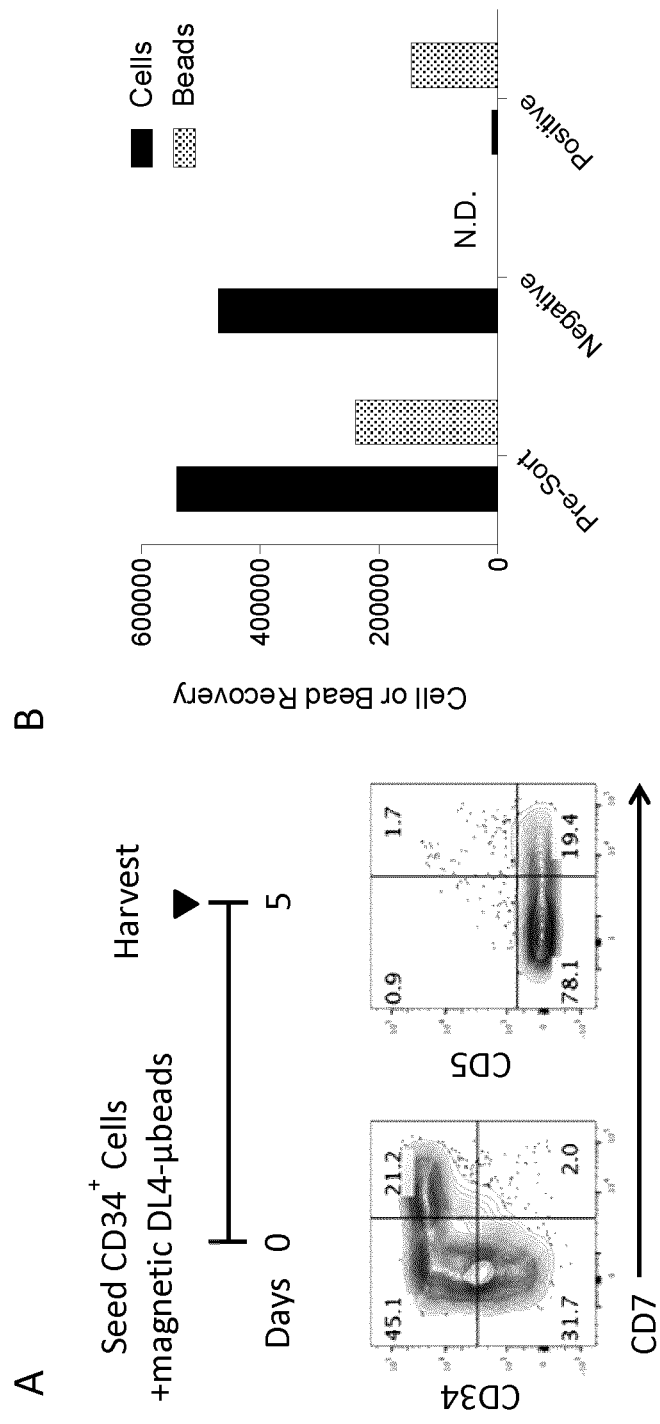

FIG. 19 shows the separation of magnetic DL4-µbeads from cellular component. $2 \times 10^5$ CD34+ CB-derived HSPCs were cultured with $1.8 \times 10^6$ iron oxide-coated DL4-µbeads in a T25 flask. A) On day 5 of culture, the percentage of CD34+ CD7+ proT cells was determined. B) The culture was then subjected to AutoMACS-mediated separation, where magnetized particles are separated from non-bound cellular component. The Negative fraction signifies the component that was not bound to the magnetized probe of the instrument. Positive is the fraction that was bound. For each fraction, its beads and cellular content was counted and compared to the original mixture (Pre-sort) using a hemocytometer. Cells are shown on the left bar and beads on the right bar for each fraction.

DETAILED DESCRIPTION

As described above, the inventors have developed a cell-free, bead-based system for generating cells of the T-cell lineage from stem or progenitor cells such as mouse or human hematopoietic stem/progenitor cells (HSPCs) or induced pluripotent stem cells (iPSCs). Non-plate-bound suspensions of Notch ligands (for example DL4-µbeads) allow for the effective generation of T-lineage cells including progenitor T cells and mature T cells.

I. Method for Generating Cells

Accordingly, the disclosure provides a method of generating cells of the T-cell lineage comprising (a) culturing a sample comprising stem cells or progenitor cells with a Notch ligand conjugated to a suspension support and (b) isolating cells of the T cell lineage.

The term "cells of the T cell lineage" refers to cells that show at least one phenotypic characteristic of a T cell or a precursor or progenitor thereof that distinguishes the cells from other lymphoid cells, and cells of the erythroid or myeloid lineages. Such phenotypic characteristics can include expression of one or more proteins specific for T-lineage on cells or a precursor or progenitor thereof, or a physiological, morphological, functional, or immunological feature specific for a T cell.

Cells of the T cell lineage may be (a) progenitor or precursor cells committed to the T cell lineage ("progenitor T cells" or "proT cells", as described herein); (b) CD25+ immature T cells; (c) cells that have undergone CD4 or CD8 lineage commitment (e.g. CD4+CD8$^{lo}$ TCR$^{int}$ cells); (d) characterized by TCR gene rearrangement; (e) precursor thymocytes that are CD4+CD8+ double positive (DP); (f) CD4−CD8+ or CD4+CD8− and optionally TCR$^{hi}$; (g) CD3+ CD90+, (h) single positive (SP) cells that are CD4−CD8+ or CD4+CD8− and TCR$^{hi}$; (i) TCR-αβ+ and/or TCR-γδ+, (j) characterized by expression of any of multiple Vβ chains (e.g. Vβ-3, -6, and 17a); or (k) mature and functional or activated T cells which may be characterized as TCR/CD3$^{hi}$, CD4−CD8+ or CD4+CD8−.

In one embodiment, a cell of the T cell lineage is a "progenitor T cell" or "proT cell". The term "progenitor T cell" or "proT cell" as used herein means a T cell that is capable of maturing into a mature T cell or lymphocyte.

In one embodiment, the progenitor T cell is a human progenitor T cell. Phenotypes of human progenitor T cells include CD34+CD7+ and CD7+CD5+CD1a−. In another embodiment, the progenitor T cell is a mouse progenitor T cell. Phenotypes of mouse progenitor T cells include CD25+.

In another embodiment, a cell of the T cell lineage is a CD4 and CD8 double positive (DP) cell characterized by CD4+CD8+ or CD4+CD8+CD3+ phenotype. In another embodiment, a cell of the T cell lineage is a CD4 or CD8 single positive (SP) cell characterized by CD4−CD8+, CD4+CD8− or CD4−CD8+CD3+, CD4+CD8−CD3+.

The term "suspension support" as used herein, refers to any material that when conjugated to a Notch ligand or other T cell co-stimulatory molecule, allows the Notch ligand (or co-stimulatory molecule) to be suspended in culture media. The suspension support can be made from a wide variety of materials and can be in a variety of formats. Examples of supports that can be used as suspension supports include, but are not limited to, particles, beads (including microbeads), proteins, lipids, nucleic acid molecules, filters, fibers, screens, mesh, tubes, hollow fibers, biological tissues and any combinations thereof.

In one embodiment, the suspension support is a particle. The particular may be of any shape, including but not limited to a sphere, oval, rod, or rectangle. The particle can be of a variety of materials, including, but not limited to natural or synthetic polymers, natural or synthetic waxes, ceramics, metals, biological materials or combinations thereof.

In one embodiment, the suspension support is a microbead. The term "microbead" or "µbead" as used herein refers to a spherical or roughly spherical bead having a diameter from 0.01 µm (10 nm) to 500 µm, optionally from 1 to 200 µm. In another embodiment, the microbead has a diameter of 6.5 to 100 µm, optionally 20 to 30 µm, 24 to 26 µm or 25 µm.

Various types of microbeads are contemplated herein. In one embodiment, the microbead is a polymer, silica or magnetic microbead. In other embodiments, the microbead is a polystyrene microbead, a gold nanoparticle or a Dynabead. In another embodiment, the microbead is a co-polymer of lactic and glycolic acid (PLGA).

Various means of conjugating proteins to supports are known in the art. A protein may be directly or indirectly conjugated to a suspension support, for example a microbead.

In one embodiment, the Notch ligand described herein is conjugated to a suspension support using a biotin/streptavidin system. Here, the Notch ligand is biotinylated and then conjugated to streptavidin-coated suspension support (for example, a streptavidin-coated microbead). In another embodiment, the Notch ligand described herein is conjugated to a suspension support via protein-G or protein A.

The term "Notch ligand" as used herein refers to a ligand capable of binding to a Notch receptor polypeptide present in the membrane of a number of different mammalian cells including hematopoietic stem/progenitor cells. The Notch receptors that have been identified in human cells include Notch-1, Notch-2, Notch-3 and Notch-4. Notch ligands typically have a diagnostic DSL domain (D-Delta, S-Serrate, and L-Lag2) comprising 20-22 amino acids at the amino terminus and between 3 to 8 EGF repeats on the extracellular surface.

The term Notch ligand includes anti-Notch antibodies and aptamers (for example DNA aptamers) that can bind and engage Notch signaling.

A Notch ligand is selected that promotes and maintains differentiation and proliferation of cells of the T cell lineage. The Notch ligand is optionally human in origin, or may be derived from other species, including mammalian species such as rodent, dog, cat, pig, sheep, cow, goat and primates.

Particular examples of Notch ligands include the Delta family. The Delta family includes Delta-1 (Genbank Accession No. AF003522, *Homo sapiens*), Delta-3 (Genbank Accession No. AF084576, *Rattus norvegicus*), Delta-like 1 (DL1, Genbank Accession No. NM_005618 and NP_005609, *Homo sapiens*; Genbank Accession No. X80903, 148324, *M. musculus*), Delta-like 3 (Genbank Accession No. NM_053666, N_446118, *Rattus norvegicus*), Delta-4 (Genbank Accession No. AF273454, BAB18580, *Mus musculus*; Genbank Accession No. AF279305, AAF81912, *Homo sapiens*), and Delta-like 4 (DL4; Genbank Accession. No. Q9NR61, AAF76427, AF253468, NM_019074, *Homo sapiens*; Genbank Accession No. NM 019454, *Mus musculus*). Notch ligands are commercially available or can be produced by recombinant DNA techniques and purified to various degrees.

The term "Notch ligand" includes homologues of the known Notch ligands that may be identified by standard techniques. "Homologue" refers to a gene product that exhibits sequence homology, either amino acid or nucleic acid sequence homology, to any one of the known Notch ligands. A Notch ligand may be at least 20%, 30%, 40%, 50%, 60%, 70%, 80%, preferably 90%, more preferably 95%, most preferably 98-99% identical at the amino acid level to a corresponding Notch ligand.

In one embodiment, homologues of Notch ligands comprise a DSL domain at the N-terminus and have between 3 to 8 EGF-like repeats on the extracellular surface. Suitable homologues will also be capable of binding to a Notch receptor. Binding to a Notch receptor may be determined by a variety of methods known in the art including in vitro binding assays.

The term "Notch ligand" also includes a mutant or variant of a known Notch ligand. The term "mutant" refers to a polypeptide having a primary amino acid sequence, which differs from the wild type sequence by one or more amino acid additions, substitutions or deletions. Preferably, the mutant has at least 90% sequence identity with the wild type sequence. Preferably, the mutant has 20 mutations or less over the whole wild-type sequence. More preferably the mutant has 10 mutations or less, most preferably 5 mutations or less over the whole wild-type sequence.

Optionally, the Notch ligand comprises at least one protein tag. A protein tag is a peptide sequence appended to a protein of interest such as a Notch ligand. The protein tag may be directly or indirectly linked to the protein of interest. Various protein tags are known in the art and can be used for a number of purposes. In one embodiment, the Notch ligand comprises an Fc tag (also known as an Fc-fusion protein). As used herein, the term "Fc" refers to the Fc domain of IgG. In one particular embodiment, Notch ligand DL4 is fused to Fc (DL4-Fc). In another embodiment, the tag is a His tag. In a further embodiment, the tag is a molecule that facilitates oligomerization of the Notch ligand. For example, a small domain of COMP (cartilage oligomeric matrix protein) can be fused to the Notch ligand (for example, DL4) to form DL4 pentamers. Ferritin can be used in a similar manner to form DL4 multimers.

According to the methods described here, cells of the T cell lineage are generated by culturing a sample comprising stem cells or progenitor cells. Stem or progenitor cells may be obtained from any suitable source, including, without limitation, umbilical cord blood, embryos, embryonic tissue, fetal tissue, bone marrow and blood. In one embodiment, the stem or progenitor cell is a hematopoietic stem or progenitor cell (HSPC). In another embodiment, the stem cell is an embryonic stem cell (ESC). In a further embodiment, the stem or progenitor cell is an induced pluripotent stem cell. In another embodiment, the stem or progenitor cell is a $CD34^+$ hematopoietic precursor cell, optionally a $CD34^+$ hemogenic endothelial precursor cell that has been differentiated from an ESC or iPSC, or a $CD34^+$ pre-hematopoietic cell differentiated from an ESC or pluripotent stem cell (PSC). Various differentiation protocols for obtaining $CD34^+$ cells are known in the art. For therapeutic applications, the stem cells or progenitor cells used to generate the cells of the T cell lineage may be obtained from the patient to be treated.

The term "hematopoietic stem/progenitor cell", "hematopoietic stem or progenitor cell" or "HSPC" as used herein refers to undifferentiated hematopoietic cells that are capable of differentiation to other cell types, including cells of the T cell lineage. HSPCs can be obtained from a number of sources including, but not limited to bone marrow, umbilical cord blood and mobilized peripheral blood (mPB). HSPCs can also be obtained from several fetal and embryonic sites, such as liver, yolk sac or dorsal aorta. HSPCs can also be obtained by inducing the differentiation of ESCs or iPSCs in culture.

The term "embryonic stem cell" or "ESC" as used herein refers to undifferentiated embryonic stem cells that have the ability to integrate into and become part of the germ line of a developing embryo.

The term "induced pluripotent stem cell" or "iPSC" as used herein refers to cells derived from somatic cells, such as skin or blood cells that have been reprogrammed back into an embryonic-like pluripotent state. In one embodiment, iPSCs are derived from T cells with a known or unknown TCR specificity (for example, T cells bearing TCRs with specificity against cancer).

Typically, a sample containing stem or progenitor cells is first depleted of non-stem cells or mature cells. Negative and positive selection methods known in the art may be used for enrichment of the stem or progenitor cells. For example, cells can be sorted based on cell surface antigens using a fluorescence activated cell sorter, or magnetic beads which bind cells with certain cell surface antigens. Negative selection columns can be used to remove cells expressing lineage specific surface antigens.

In an embodiment, a sample containing stem or progenitor cells is separated into lineage-negative ($Lin^-$) and lineage position ($Lin^+$) fractions. The $Lin^-$ fraction can be sorted for $CD34^+$ cells.

The progenitor cells or stem cells are cultured under suitable conditions as described herein to generate cells of the T cell lineage. Preferably, the cells are cultured in the presence of one or more Notch ligands conjugated to a suspension support for a sufficient time to form cells of the T cell lineage.

One advantage of the methods described herein is that they allow the cells of the T cell lineage to be cultured in suspension. In an embodiment, the progenitor cells or stem cells are cultured in suspension with a Notch Ligand conjugated to a suspension support such as a microbead. In a suspension culture, cells grow free-floating in a culture medium. In contrast, in an adherent culture, cells grow as monolayers on an artificial substrate.

In another embodiment, the progenitor cells or stem cells are cultured in suspension in a bioreactor, optionally a closed or a closed, automated bioreactor, with a Notch ligand conjugated to a suspension support. In one embodiment, the suspension support is a microbead that has a diameter that is compatible with the bioreactor. Various bioreactors are known in the art and can include batch, fed batch or continuous bioreactors. An example of a continuous bioreactor is a continuous stirred-tank reactor model.

Various concentrations of progenitor cells or stem cells in the culture are contemplated. For example, the concentration of progenitor cells or stem cells in the culture may be anywhere from 1 to millions of cells per ml of media.

In one embodiment, the ratio of microbead-conjugated Notch ligand to progenitor cells or stem cells is between 1:1 and 27:1, optionally 5:1 to 15:1, 8:1 to 10:1 or 9:1. This ratio is also referred to herein as the "microbead to cell ratio".

The inventors have also shown that the direction of the orientation of the Notch ligand to the suspension support can enhance Notch signaling. Accordingly, in one embodiment, the C-terminus of the Notch ligand is conjugated to the suspension support. This can be engineered, for example, by adding a sequence at the C-terminal end of the Notch ligand that can be enzymatically conjugated to a biotin molecule. In another embodiment, the Fc segment of the fusion protein, Notch ligand-Fc, present in the C-terminal region, can directly bind to protein A or protein G that is conjugated to the suspension support.

One or more positive cytokines that promote commitment and differentiation of cells of the T cell lineage may also be added to the culture. The cytokines may be human in origin, or may be derived from other species. The concentration of a cytokine in a culture is typically about 1-10 ng/ml. The following are representative examples of cytokines that may be employed in the present application: all members of the Flt-3-ligand, and interleukin-7 (IL-7) and Stem Cell Factor. In one embodiment, the cytokines used herein are Flt-3-ligand and IL-7 and Stem Cell Factor. The cytokines may be used in combination with equal molar or greater amounts of a glycosaminoglycan such as heparin sulfate. The cytokines are commercially available or can be produced by recombinant DNA techniques and purified to various degrees. Some of the cytokines may be purified from culture media of cell lines by standard biochemical techniques.

One or more additional molecules, each conjugated to a suspension support, may also be added to the culture. In one embodiment, the additional molecule is a molecule that promotes T cell development (for example, promotes commitment and differentiation of cells of T cell lineage), also referred to herein as a "T cell co-stimulatory molecule". In one example, the inventors have shown that microbead-conjugated DL4 and VCAM1 cultured with HSPCs accelerated differentiation to the T cell lineage. Thus, in one embodiment, the T cell co-stimulatory molecule is VCAM1. As used herein, the term "VCAM1" refers to Vascular cell adhesion protein 1 also known as vascular cell adhesion molecule 1 (VCAM1) or cluster of differentiation 106 (CD106), a protein that in humans is encoded by the VCAM1 gene. The term "VCAM1" also includes a mutant or variant of a VCAM1. In another embodiment, the T cell co-stimulatory molecule is a cytokine or chemokine (Stem Cell Factor, IL-7, CCL25, or CXCR4), Major Histocompatibility Complex (MHC) class I or class II, or co-stimulatory (CD80, CD86) molecule. Optionally, the T cell co-stimulatory molecule comprises at least one protein tag. Various protein tags are known in the art and can be used for a number of purposes. In one embodiment, the T cell co-stimulatory molecule comprises an Fc tag (also known as an Fc-fusion protein).

The progenitor cells and stem cells may be cultured in culture media comprising conditioned media, non-conditioned media, or embryonic stem cell media. Examples of suitable conditioned media include IMDM, DMEM, or αMEM, conditioned with embryonic fibroblast cells (e.g. human embryonic fibroblast cells or mouse embryonic fibroblast cells), or equivalent media. Examples of suitable non-conditioned media include Iscove's Modified Dulbecco's Medium (IMDM), DMEM, or αMEM, or equivalent media. The culture media may comprise serum (e.g. bovine serum, fetal bovine serum, calf bovine serum, horse serum, human serum, or an artificial serum substitute) or it may be serum free. Other examples of media useful in the present methods include StemCell Technologies media (StemSpan™ SFEM II) or any other commercially available equivalent media.

In one embodiment, the culture conditions entail culturing the progenitor cells or stem cells for a sufficient period of time so that cells in the preparation form proT cells. In another embodiment, the culture conditions entail culturing the progenitor cells or stem cells for a sufficient period of time so that cells in the preparation form mature T cells, for example mature SP T cells. It will be appreciated that the cells may be maintained for the appropriate amount of time required to achieve the desired cellular composition. Optionally, the progenitor cells or stem cells are cultured for at least 6, 8, 10, 12, 14, 21, 28, 35 or 42 days. In one example, the progenitor cells or stem cells are cultured with the Notch ligand described herein for 4 to 21 days, 6 to 18 days or 7 to 14 days to generate proT cells. In another example, the progenitor cells or stem cells are cultured with the Notch ligand described herein for at least 21, 28, 35 or 42 days to generate mature T cells.

The methods of the present application allow the generation of large numbers of cells of the T cell lineage. In particular, in one embodiment, following 14 or more days of culture, greater than 50-fold, 75-fold, 100-fold, 125-fold, 150-fold, 175-fold or 200-fold cell expansion over the initial starting number of stem cells or progenitor cells is obtained.

The term "isolated" as used herein means that the progenitor cell has been separated or purified from cellular or biological material found with the cells in their native environment. It thus distinguishes the cells from how they exist in nature.

The term "a cell" or "the cell" includes a plurality of cells.

II. Suspension Notch Ligands

The present inventors have also developed novel suspension Notch ligands. As used herein, the term "suspension Notch ligand" refers to a Notch ligand for use in a suspension cell culture.

Accordingly, the disclosure also provides a suspension Notch ligand as described herein. The suspension Notch ligand comprises (a) a Notch ligand and (b) a suspension support, wherein the Notch ligand is conjugated to the suspension support.

In particular, the present inventors have shown that DL4 when directly conjugated to 25 μm diameter microbeads delivers a strong and sustained signal to induce HSPCs to develop into cells of the T cell lineage. Therefore, in one embodiment, the suspension support is a microbead having a diameter of 10 to 100 µm, optionally 20 to 30 µm, 24 to 26 µm or 25 µm.

The inventors have further shown that the direction of the orientation of the Notch ligand to the suspension support can enhance Notch signaling. Accordingly, in another embodiment, the C-terminus of the Notch ligand is conjugated to the suspension support. As described above, this can be engineered, for example, by adding a sequence at the C-terminal end of the Notch ligand that can be enzymatically conjugated to a biotin molecule.

The Notch ligand is optionally DL4 and may be fused to a tag, for example the Fc tag.

Also provided herein is a suspension T cell co-stimulatory molecule. As used herein, the term "suspension T cell co-stimulatory molecule" refers to a T cell co-stimulatory molecule for use in a suspension cell culture. The suspension T cell co-stimulatory molecule comprises (a) T cell co-stimulatory molecule and (b) a suspension support, wherein the T cell co-stimulatory molecule is conjugated to the suspension support.

The T cell co-stimulatory molecule is optionally VCAM1 and may be fused to a tag, for example the Fc tag.

III. Kits

Suspension Notch ligands may be prepared and packaged in kits for use in generating cells of the T cell lineage.

Accordingly, also provided herein is a kit for producing cells of the T cell lineage comprising a suspension Notch ligand, wherein the suspension Notch ligand comprises (a) a Notch ligand and (b) a suspension support, wherein the Notch ligand is conjugated to the suspension support. Optionally, the suspension Notch ligand is contained in a preservative and/or buffer solution and the kit further comprises a device for dispensing the suspension Notch ligand such as a vial or syringe.

In one embodiment, the kit further comprises culture media for culturing a sample comprising stem cells or progenitor cells with a suspension Notch ligand. Examples of culture media include conditioned media, non-conditioned media, or embryonic stem cell media. The culture media may comprise serum (e.g. bovine serum, fetal bovine serum, calf bovine serum, horse serum, human serum, or an artificial serum substitute) or it may be serum free. Other examples of culture media useful include StemCell media or any other commercially available equivalent media.

In another embodiment, the kit further comprises one or more additional molecules, each conjugated to a suspension support. In one embodiment, the additional molecule is a molecule that promotes T cell development (for example, promotes commitment and differentiation of cells of T cell lineage), also referred to herein as a "T cell co-stimulatory molecule". In another embodiment, the T cell co-stimulatory molecule is VCAM1.

The media optionally includes one or more cytokines that promote commitment and differentiation of cells of the T cell lineage. The cytokines may be human in origin, or may be derived from other species. The concentration of a cytokine in a culture is typically about 1-10 ng/ml. The following are representative examples of cytokines that may be employed in the present application: all members of the Flt-3-ligand, and interleukin-7 (IL-7) and Stem Cell Factor. In one embodiment, the cytokines used herein are Flt-3-ligand and IL-7 and Stem Cell Factor. The cytokines may be used in combination with equal molar or greater amounts of a glycosaminoglycan such as heparin sulfate. The cytokines are commercially available or can be produced by recombinant DNA techniques and purified to various degrees. Some of the cytokines may be purified from culture media of cell lines by standard biochemical techniques.

In one embodiment, the kit comprises one or more containers for the within-described reagents.

Printed instructions providing guidance in the use of the reagent(s) may also be included in the kit, in various embodiments. The term "instructions" or "instructions for use" typically includes a tangible expression describing the reagent concentration or amount of the suspension Notch ligand and/or at least one assay method parameter, such as the relative amounts of suspension Notch ligand and cells to be mixed, culturing time periods, temperature, media conditions, and the like. For example, in one embodiment, the instructions describe a method comprising (a) culturing a sample comprising stem cells or progenitor cells with a Notch ligand conjugated to a suspension support and (b) isolating cells of the T cell lineage.

IV. Cells of the T Cell Lineage

The disclosure further provides cells of the T cell lineage generated by the methods, systems and kits described herein, or mitotic or differentiated cells that are progeny of the cells.

In one embodiment, the disclosure provides a "progenitor T cell" or "proT cell" generated by the methods described herein. In another embodiment, the progenitor T cell is a human progenitor T cell, for example a human progenitor T cell characterized by CD34+CD7+ or CD7+CD5+CD1a−.

In another embodiment, the progenitor T cell is a mouse progenitor T cell, for example a mouse progenitor T cell characterized by CD25+.

The disclosure also provides a double positive (DP) T-cell characterized by CD4+CD8+ or CD4+CD8+CD3+. The disclosure further provides a cell of the T-cell lineage that is a single positive (SP) cell characterized by CD4−CD8+, CD4+CD8− or CD8+CD3+, CD4+CD3+.

In one embodiment, a cell of the T cell lineage generated by the methods described herein (for example, a progenitor T cell or a mature T cell) is engineered with a T cell receptor (TCR) or a chimeric antigen receptor (CAR) to confer specificity to tumor associated antigens (TAA). Cells engineered as such can be useful for treating conditions such as cancer.

In another aspect, the present disclosure provides a pharmaceutical composition comprising isolated cells of the T cell lineage generated by the methods described herein and a pharmaceutically acceptable diluent or carrier.

Suitable diluents and carriers are described, for example, in Remington's Pharmaceutical Sciences. On this basis, the compositions include, albeit not exclusively, solutions of the proT cells in association with one or more pharmaceutically acceptable vehicles or diluents, and contained in buffered solutions with a suitable pH and iso-osmotic with physiological fluids.

Pharmaceutical compositions include, without limitation, lyophilized powders or aqueous or non-aqueous sterile injectable solutions or suspensions, which may further contain antioxidants, buffers, bacteriostats and solutes that render the compositions substantially compatible with the tissues or the blood of an intended recipient. Other components that may be present in such compositions include water, surfactants (such as Tween™), alcohols, polyols, glycerin and vegetable oils, for example. Extemporaneous injection solutions and suspensions may be prepared from sterile powders, granules, tablets, or concentrated solutions or suspensions. The composition may be supplied, for example but not by way of limitation, as a lyophilized powder which is reconstituted with sterile water or saline prior to administration to the patient.

Pharmaceutical compositions also include cyropreservative solutions. In one embodiment, cells of the T cell lineage generated by the methods described herein are cryopreserved in appropriate media, for example pharmaceutically acceptable or GMP-grade media and optionally formulated for administration to a subject in need thereof.

Suitable pharmaceutically acceptable carriers include essentially chemically inert and nontoxic compositions that do not interfere with the effectiveness of the biological activity of the pharmaceutical composition. Examples of suitable pharmaceutical carriers include, but are not limited to, water, saline solutions, glycerol solutions, ethanol, N-(1 (2,3-dioleyloxy)propyl)N,N,N-trimethylammonium chloride (DOTMA), diolesyl-phosphotidyl-ethanolamine (DOPE), and liposomes. Such compositions should contain a therapeutically effective amount of the compound, together with a suitable amount of carrier so as to provide the form for direct administration to the patient.

The compositions can be administered for example, by parenteral, intravenous, subcutaneous, intramuscular, intracranial, intraorbital, ophthalmic, intraventricular, intracapsular, intraspinal, intracisternal, intraperitoneal, intranasal, aerosol or oral administration. For parenteral administration, solutions of the pro-T cells described herein can be prepared in water suitably mixed with a surfactant such as hydroxypropylcellulose. Dispersions can also be prepared in glycerol, liquid polyethylene glycols, DMSO and mixtures thereof with or without alcohol, and in oils. Under ordinary conditions of storage and use, these preparations contain a preservative to prevent the growth of microorganisms. A person skilled in the art would know how to prepare suitable formulations.

Preferably the cells of the T cell lineage are present in an amount effective for treating a disease state in a subject need thereof. In one embodiment the cell of the T cell lineage is present in an amount effective to enhance hematopoietic progenitor cell engraftment in a subject in need thereof. Optionally, the composition further comprises cells of the T cell lineage, or tissue for transplantation. In one embodiment the tissue comprises a thymus. In another embodiment the tissue comprises an organ.

V. Therapeutic Applications

The ability to generate in vitro-derived human progenitor T cells and to test their safety in human/mouse immune engraftment models, opens avenues for cellular based approaches for treating immune-related disorders of the T lineage (Legrand et al., 2006; van den Brink et al., 2004). T cells are the major effector arm of the adaptive immune system in recognizing and eliminating viral and bacterial pathogens. In certain rare blood cancers, such as T cell acute lymphoblastic leukemia (T-ALL), T cells proliferate, crowding out healthy immune cells and perturbing normal immune function (Ferrando et al., 2002; Weng et al., 2004). Although chemotherapy can often impart therapeutic benefits in cancer patients, it often can lead to immuno-deficiency and susceptibility to opportunistic infections. Opportunistic infections also pose a serious concern in AIDS patients whose $CD4^+$ T cells have been depleted following infection with HIV. While immunodeficiency remains a serious concern in HIV/AIDS and cancer, immune-hyperactivity is equally problematic in autoimmune disease where T cells that lack proper regulatory control generate immune responses to self-tissue.

Accordingly, the present application includes a method of treating a subject having a condition requiring an increase in the number of T cells comprising:
 (i) generating cells of the T cell lineage comprising (a) culturing a sample comprising stem cells or progenitor cells with a Notch ligand conjugated to a suspension support, optionally a particle or a microbead, and (b) isolating cells of the T cell lineage, and
 (ii) administering an effective amount of the cells of the T cell lineage to a subject in need thereof.

In one embodiment, the cells of the T cell lineage are progenitor T cells.

In another embodiment, the cells of the T cell lineage are mature T cells.

The disclosure also provides a use of cells of the T cell lineage, optionally progenitor T cells or mature T cells, generated by the methods described herein for treating a subject having a condition requiring an increase in the number of T cells.

The disclosure also provides a use of cells of the T cell lineage, optionally progenitor T cells or mature T cells, generated by the methods described herein for use in regenerative medicine, for example to replace and/or regenerate tissues affected by disease or trauma.

As used herein, the phrase "effective amount" or "therapeutically effective amount" means an amount effective, at dosages and for periods of time necessary to achieve the desired result. Effective amounts may vary according to factors such as the disease state, age, sex, weight of the subject. The amount of a given cell preparation that will correspond to such an amount will vary depending upon various factors. Such as the pharmaceutical formulation, the route of administration, the type of disease or disorder, the identity of the subject or host being treated, and the like, but can nevertheless be routinely determined by one skilled in the art. An "effective amount" will preferably be an amount effective for the cell of the T cell lineage to engraft the subject being treated.

The term "treating" or "treatment" as used herein and as is well understood in the art, means an approach for obtaining beneficial or desired results, including clinical results. Beneficial or desired clinical results can include, but are not limited to, alleviation or amelioration of one or more symptoms or conditions, diminishment of extent of disease, stabilized (i.e. not worsening) state of disease, preventing spread of disease, delay or slowing of disease progression, amelioration or palliation of the disease state, diminishment of the reoccurrence of disease, and remission (whether partial or total), whether detectable or undetectable. "Treating" and "treatment" can also mean prolonging survival as compared to expected survival if not receiving treatment. "Treating" and "treatment" as used herein also include prophylactic treatment.

The term "subject" as used herein means any member of the animal kingdom and is preferably a human.

A "condition requiring an increase in number of T cells" includes any condition wherein T cell levels are reduced as compared to a healthy animal, including, without limitation, immunodeficiency, cancer, genetic diseases (for example, Primary Immunodeficiency Diseases (PIDs)), infectious diseases, immune disorders and autoimmunity.

As set out above, the cells of the T-cell lineage described herein can be engineered to express T cell receptors (TCRs)

or a chimeric antigen receptors (CARs) that specifically recognize tumor associated antigens.

Accordingly, the present application also includes a method of treating cancer in a subject comprising:
(i) generating cells of the T cell lineage comprising (a) culturing a sample comprising stem cells or progenitor cells with a Notch ligand conjugated to a suspension support, optionally a particle or a microbead, and (b) isolating cells of the T cell lineage, and
(ii) administering an effective amount of the cells of the T cell lineage to a subject in need thereof,
wherein the cells of the T cell lineage are engineered with a T cell receptor (TCR) or a chimeric antigen receptor (CAR) to confer specificity to a tumor-associated antigen.

The disclosure also provides a use of cells of the T cell lineage, optionally progenitor T cells or mature T cells, generated by the methods described herein for treating a subject with cancer, wherein the cells of the T cell lineage are engineered with a T cell receptor (TCR) or a chimeric antigen receptor (CAR) to confer specificity to a tumor-associated antigen. Optionally, the iPSCs can be derived from T cells with a known or unknown TCR specificity (for example, T cells bearing TCRs with specificity against cancer), and these T-iPSCs can then be used to generate T cells by the methods described herein.

The following non-limiting examples are illustrative of the present application:

EXAMPLES

Example 1

Materials and Methods

Hematopoietic Stem Cell Sources

Human umbilical cord blood (UCB) samples were obtained by syringe extraction and collected in a blood-pack unit containing citrate phosphate dextrose anti-coagulant (Baxter Healthcare, Deerfield, Ill.) from consenting mothers following delivery in accordance to approved guidelines established by the Research Ethics Board of Sunnybrook Health Sciences Centre. Within 24 hours of collection, UCB mononuclear cells were isolated using Ficoll density centrifugation, and pre-enriched for lineage negative (Lin$^-$) CD34$^+$ cells using the EasySep Human CD34 Positive Selection Kit (Stemcell Technologies, Vancouver, B.C.) according to the manufacturer's instructions. To isolate human HSPCs, Lin$^-$ cells were stained with anti-human CD38-APC and anti-human CD34-PE mAbs and sorted for CD34$^+$CD38$^{-/lo}$ cells using BD Biosciences FACSAria sorter (BD, San Jose, Calif.). Sorted human HSPCs were greater than 99% pure as determined by post-sort analysis. Some CD34+ cells derived from cord blood and all CD34+ cells derived from mobilized peripheral blood (mPB) were purchased from Stemcell Technologies. For mPB, volunteers were treated with a combination of G-CSF (maximum of 10 µg/kg/day of G-CSF for 3-5 days prior to collection) and Plerixafor (maximum of 0.24 mg/kg 1 day prior to collection).

DL4-Fc Design and Production

Delta-like-4 was genetically engineered into a pDL4-Fc-His-B plasmid construct by fusing the coding sequence of the extracellular domain of human DLL4 (amino acid residues [aa] 1-529) to Histidine (His) tag followed by the Fc portion of human IgG3 (including the hinge region) along with Bir1A recognition sequence (Avitag™) at the C-terminus interspaced by linker sequences. Other constructs that could be used in these methods include i) human DLL4 (aa 1-524) fused to the Fc portion of IgG1, ii) signal sequence for Alkaline Phosphatase (aa 1-17) human DLL4 (aa 27-524) fused to the Fc portion of IgG1, iii) human DLL4 (aa 1-524) fused to StreptagII and 6×His at the C-terminus, iv) signal sequence for Alkaline Phosphatase (aa 1-17) human DLL4 (aa 27-524) fused to 10×His at the C-terminus and any combination thereof. The present construct was inserted it into pIRESpuro2 mammalian expression plasmid (Clontech, Mountainview, Calif.). The resulting plasmid was transfected into HEK-293T cells using standard CaPO$_4$ transfection methods and cells with stably integrated plasmid were selected based on their resistance to 2 mg/mL of puromycin added to the standard DMEM [supplemented with 10%(v/v) FBS, 2 mM Glutamax, Penicillin (100 U/ml)/Streptomycin (100 mg/ml) (all products of Thermo Fisher Scientific, Rockford, IL), 2 mM 2-mercaptoethanol (Sigma-Aldrich, St. Louis, MI)]. Cells were expanded and transferred to grow in Freestyle 293 expression media (Thermo Fisher Scientific). DL4-Fc fusion protein secreted into the media was purified using HiTrap Protein G affinity columns (GE Healthcare Life Sciences, Marlborough, MA) attached to the ÄKTAprime plus (GE Healthcare) automated chromatography system.

VCAM1-Fc Design and Production

Recombinant VCAM1-Fc was genetically engineered to include the VCAM-1 extracellular domain, the IgG3 Fc domain and an Avitag™ biotinylation site, similar to DL4-Fc. The material and methods used for VCAM1-Fc fusion protein manufacture and purification were the same to that of DL4-Fc fusion protein described above.

Biotinylation of DL4-Fc and VCAM1-Fc

NHS-activated biotin was added to purified DL4-Fc at an optimized molar ratio to achieve two biotin molecules per molecule of DL4-Fc. Non-reacted NHS-biotin was removed from the mixture by dialysis or buffer exchange in PBS and biotin incorporation was estimated using the HABA (4'-hydroxyazobenzene-2-carboxylic acid) method (Pierce Biotin Quantitation Kit, Product No. 28005). Biotinylated DL4-Fc was subsequently stored at 4° C.

To direct the orientation of DL4-Fc onto streptavidin (SA)-coated surfaces, a single biotin molecule was enzymatically conjugated to the AviTag™ sequence on the Fc region of DL4-Fc using the BirA-500 Kit (Avidity) according to the manufacturer's instructions. Briefly, 2.5 µg of BirA was added to 500 µg of DL4-Fc in a reaction volume of 500 µL PBS and incubated for 1 hr at RT. To remove any remaining biotin, 350 µL of purified DL4-Fc protein was desalted using a 40K MWCO Zeba™ Spin Desalting Column (Thermo-Fisher) according to the manufacturer's instructions. Biotinylated DL4-Fc was subsequently stored at 4° C. VCAM1-Fc protein containing the Avitag™ was biotinylated at its C-terminus using the same methods and materials as above.

Biotinylated DL4-Fc Conjugation to Streptavidin-Coated-Microbeads

1 µg of biotinylated DL4-Fc was incubated with a variety of sizes of streptavidin (SA)-coated polystyrene µbeads (Spherotech, Lake Forest, Ill.), ranging from 1 µm to 100 µm in diameter. D4-Fc was also conjugated to SA-coated Dynabeads (Thermo-Fisher) and 50 nm nanogold particles and each were incubated in 2 mL of PBS for 30 min at RT, and mixed via vortex every 10 minutes. In all cases, the surface area of the particles was equivalent to $2 \times 10^5$ of 25 µm SA-µbeads. DL4-Fc conjugated beads were washed with 4 mL PBS and spun down at 3000×g for 10 minutes. The supernatant was carefully collected to both remove any unbound ligand from the mixture and to assay for DL4-Fc content to assess binding to µbeads. After a second wash, DL4-µbeads were re-suspended in various volumes of PBS to achieve indicated concentrations as stated in the text. Unconjugated µbeads were prepared in parallel, to serve as a negative control.

For compound conjugation of DL4-Fc and VCAM1-Fc to SA-µbeads, the DL4-Fc amount was kept constant at 1 µg per $2 \times 10^5$ SA-µbeads, while VCAM1-Fc was added at 0.01 µg (for 100:1), 0.1 µg (for 10:1), 1 µg (for 1:1) and 10 µg (for 1:10).

Development of NOTCH-Activation Reporter Cell Line, 3T3-N1Cluc

A Notch-responsive element (8×RBPJ consensus binding sites) was inserted into the promoterless pGL4.17[luc2/Neo] plasmid (Promega). Hence, a single plasmid was created (named pGL4.17-N1Rep) that reported Notch activation by expressing luciferase enzyme, while conferring resistance to Neomycin. NIH3T3 cells were then transfected with pMIGR-NOTCH1 (a gift from Dr. Warren Pear, UPenn) and pGL4.17N1Rep plasmids. Cells that were resistant to Neomycin treatment (1 µg/mL) were first selected and then sorted for cells that expressed GFP by flow cytometry. Next, clones of NIH3T3 cells were isolated by single cell deposition into 96 well plates. Each clone's response to activation to plate-bound DL4-Fc (deposited overnight at 20 µg/mL) was then measured. The clones, named 3T3N1CLuc, with the least amount of background and highest Notch activation response were expanded and used for conducting experiments to measure Notch receptor activation.

3T3-N1CLuc Luciferase Assay to Measure Notch Activation

DL4-µbeads were added to $3 \times 10^4$ 3T3-N1CLuc cells in a standard tissue culture (TC)-treated flat-bottom 96-well plate and incubated overnight in αMEM supplemented with 5% FBS. Cells were lysed and assayed for luciferase activity using the Firefly Luciferase Assay Kit 2.0 (Biotium, Fremont, CA) according to the manufacturer's instructions. Briefly, growth medium was removed and cells were washed with PBS prior to adding lysis buffer. Cells were lysed by freezing at −80° C. for 10 min followed by thawing before transferring lysates to a 96-well flat-bottom opaque polystyrene plate (Corning). D-luciferin was prepared and added to each well by automatic dispenser and analyzed using the Synergy H1 plate reader (BioTek Instruments Inc., Winooski, Vt.). Human IgG and DL4-Fc plate-bound controls were prepared the previous day by adsorbing 504/well of protein (5-20 µg/mL) to flat-bottom 96-well plates overnight at 4° C. prior to washing and seeding of 3T3-N1CLuc cells the following day.

Coated DL4-Fc Plate and DL4-µBead Cultures with HSPCs

Different numbers of DL4-µbeads were added to $3 \times 10^3$ mouse Lin$^-$ Sca-1$^+$ cKit$^+$ HSCs (sorted from the bone marrow of C57BL6 mice by flow cytometry) to achieve cell to beads ratios of 1:1, 1:3, 1:9 and 1:27. For each condition, the cell-beads combination was incubated in a single well of a round-bottom 96-well plate in 200 µL IMDM [supplemented with 20% BIT (STEMCELL Technologies), 1% Glutamax (Thermo), 50 ng/mL SCF, 10 ng/mL Flt3L and 10 ng/mL IL-7 (R&D Systems, Minneapolis, Minn.)]. Human IgG and DL4-Fc plate-bound controls were prepared the previous day by adsorbing 50 µL/well of protein (20 µg/mL) to flat-bottom 96-well plates overnight at 4° C. prior to washing and plating of cells the following day. On day 7 of co-culture, cells were harvested and stained with antibodies against mouse CD45, CD25, CD44, CD90, CD11 b, and CD19, followed by analysis on a LSR II cytometer (BD Biosciences).

For human HSPCs, Lin$^-$ CD34$^+$ CD38$^{-/lo}$ cells were sorted from UCB by flow cytometry and $4 \times 10^3$ cells were cultured with 36,000 DL4-µbeads per well of a 96 round-bottom well plate in 200 µL StemSpan™ SFEM II (Stemcell Technologies) supplemented with StemSpan™ T Cell Progenitor Expansion Supplement (Stemcell Technologies) for 14 days with a 50% media exchange at day 7. For cultures beyond 14 days, cells were harvested, counted and seeded with fresh DL4-µbeads. On day 14 of co-culture, cells were counted to determine cell expansion and stained with antibodies against CD34, CD5, CD1a and CD7 to assay for lineage progression. To assay for development beyond the proT cell stage, cells were also stained with antibodies against CD4, CD8 and CD3 at later time points.

Differentiation of Human Induced Pluripotent Stem Cells (iPSCs) to CD34$^+$ Pre-Hematopoietic or Hemogenic Endothelial Cells to T Cells The reprogrammed hiPSC lines were derived from fibroblasts (AlStemBio Cat #iPSC11) and T cells (Harvard Stem Cell Science Cat #STiPS A3). They were cultured in mTeSR medium (StemCellTech) on Matrigel. To generate self-aggregated EBs, iPSCs were treated with collagenase B for 20 min followed by a short trypsin-EDTA step. Cell were gently scraped with a cell scraper to form small aggregates. EBs were generated during the first 24 hr of culture in StemPro-34 (Invitrogen) in the presence of BMP-4, subsequently cultured in the presence of BMP-4 and bFGF for the next 24 hr, and then in the presence of BMP-4, bFGF, and SB for the following 48 hr (days 2-4). At day 4, BMP-4 and SB were removed and replaced with VEGF, IL-6, IL-11, IGF-1, SCF, EPO, TPO, Flt-3, IL-3, and DKK1 (all cytokines from Miltenyi Biotec, Auburn, CA or R&D Systems). Cultures were maintained in a hypoxic environment at 5% $CO_2$/5% $O_2$/90% $N_2$ for 8 days. On day 8, cells were MACS-enriched for CD34$^+$ cells, as described (Kennedy et al., 2012), and incubated with DL4-µbeads plus StemSpan™ SFEM II (Stemcell Technologies) supplemented with StemSpan™ T Cell Progenitor Expansion Supplement (Stemcell Technologies) as described above, in order to generate T cells.

Adoptive Transfer of Progenitor T Cells into Immunodeficient Mice

In preparation for adoptive transfer into immunodeficient mice, large-scale human HPSC/DL4-µbead cultures were set up. $2 \times 10^5$ CD34$^+$ HSPCs were incubated with $1.8 \times 10^6$ DL4-µbeads in T25 flasks (Thermo Scientific) for 7-10 days, at which time, progenitor T (proT) cells identified as CD34$^+$ CD7$^+$ cells were sorted using a FACSAria cell sorter (BD Biosciences, San Jose, CA). Alternatively, when HSPCs were cultured with iron-oxide-coated DL4-μbeads, a magnetic separation of DL4-μbeads from the cellular component was performed using the autoMACS-pro cells sorter (Miltenyi Biotec). The proT cells were injected intrahepatically into day 3-6 immunodeficient NOD-Scid/IL2rγ$^{null}$ (NSG) neonates. Each mouse received 3-5×10$^5$ proT cells along with hIL-7 (0.5 μg/mouse) and anti-IL-7 monoclonal antibody (mAb), clone M25, (2.5 μg/mouse) in a total volume of 50 μl in α-MEM. Mice were boosted with IL-7/M25 cocktail every 3-4 days. Lymphoid organs thymus, spleen and bone marrow were harvested after 3 or 12 weeks post-transplant. Single cell suspensions were prepared from each organ, stained and analyzed using LSR-II cytometer (BD Biosciences). Engraftment was assessed by electronically gating on live cells that excluded the cell death marker 4'-6-Diamidino-2-phenylindole (DAPI) and on cells expressing human CD45.

Results

DL4 μBeads Induce Strong Notch Signaling

Previous work from the inventors' laboratory showed that a DL4 fusion protein, DL4-Fc, when immobilized to the surface of a standard TC-treated well/plate, could induce Notch signaling in mouse and human HSPCs that was sufficient to induce the development of T-lineage cells (Shukla et al., 2017). However, this 2D format is limited in scalability and capacity to deliver strong and persistent Notch signals to promote T cell development.

The group of Taqvi et al., (2006) attempted to functionalize 2.8 μm magnetic beads with DL4 and co-cultured them with mouse HSGs. The mixture was placed on top of OP9 cells with a permeable insert between them. This prevented physical contact between the stem cells and stromal cells, but allowed for requisite soluble factors to pass through to promote differentiation. While some CD90$^+$ (Thy1) cells did emerge from the cultures with DL4 functionalized μbeads, Thy1 expression is not a definitive T-lineage marker. Significantly, CD19$^+$ B cells also emerged. There is a threshold of sustained Notch activation needed to promote T cell development and to inhibit B cell development. The fact that B cells were still present demonstrates that this system did not have the capacity to activate and sustain Notch signaling. In fact, increase of beads to cell ratio from 1:1 to 5:1 promoted B cell differentiation and blocked Thy1 expression. Together with the known requirement for cell-based or plate-bound Notch ligands to induce strong Notch signaling, the notion that soluble Notch ligands presented in a μbead format failed to induce the required levels of Notch signals suggest that this approach would be unlikely to be applicable for the generation of T cells from HSPCs. Additionally, these types of studies have yet to be performed using human CD34$^+$ cells. Thus, it remained to be established whether μbeads functionalized with DL4 could provide the necessary high and constant levels of Notch signaling that are required to induce T cell development from HSPCs, which would then be readily scalable and translatable for clinical use.

Accordingly, the present inventors investigated whether conjugating DL4-Fc to μbeads would create a high-order DL4 multimeric platform that could effectively engage Notch receptors and function in suspension with HSPCs and therefore be amenable to scale-up.

Figure 1:
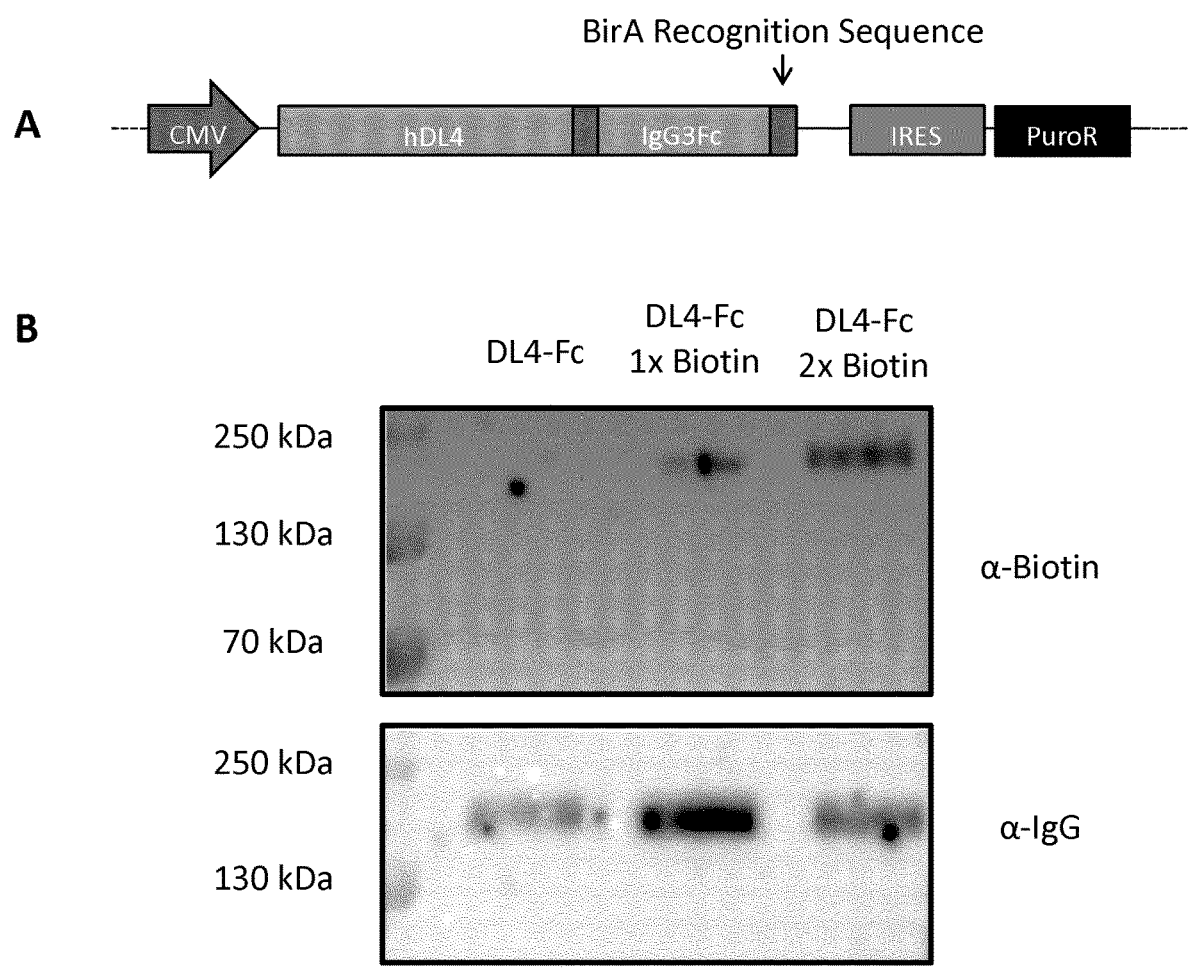
FIG. 1 shows DL4-Fc construct design and biotinylation. A) A DL4-Fc fusion construct is depicted with its components of extracellular domain of humanDL4, purification purposes and Fc region of human IgG3 (IgG3Fc). B) Western blot analysis of chemically biotinylated DL4-Fc using anti-biotin (top) and anti-human IgG (bottom) under non-reducing conditions.
Figure 2:
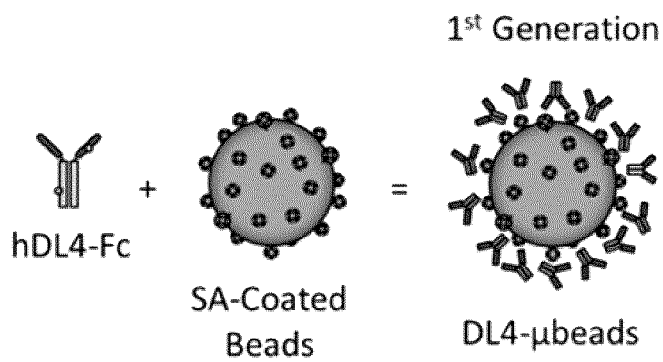
FIG. 2 shows activation of Notch reporter cells by $1^{st}$ generation DL4-µbeads. A) Chemically biotinylated DL4-Fc protein were conjugated to SA-coated beads to form randomly-oriented $1^{st}$ generation DL4-µbeads, ranging from 50 nm Gold nanoparticles (GNP) to 100 µm µbeads. B) $3\times10^4$ 3T3-N1Cluc cells were incubated on plates pretreated with hIgG as negative control or with DL4-Fc at different concentrations as indicated. Alternatively, the cells were incubated with different numbers of DL4-µbeads on untreated plates. The number of beads in each condition presented in aggregate, the same surface area and therefore, the same total number of DL4-Fc molecules. 24 h after plating, the cells were lysed and analyzed for luciferase activity.
Figure 2:
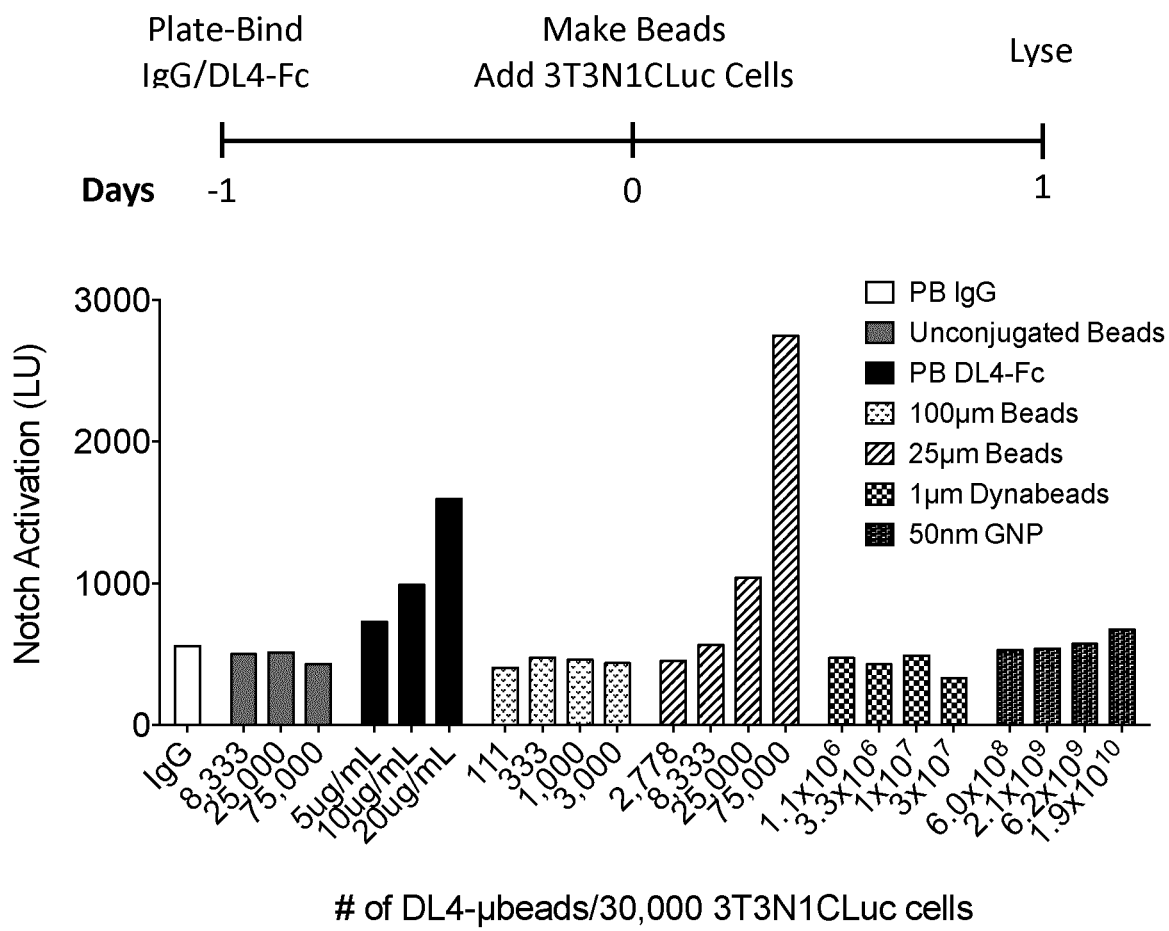

To facilitate the linkage of DL4-Fc to μbeads, DL4-Fc was chemically biotinylated in preparation of binding to SA-coated polystyrene beads (FIG. 1A). Biotin incorporation onto DL4-Fc was confirmed via Western Blot (FIG. 1B) and its subsequent conjugation to μbeads was assayed through protein quantification of supernatants harvested pre- and post-conjugation. To evaluate the influence of bead size on Notch signaling delivery, non-biotinylated DL4-Fc was covalently conjugated to 50 nm NHS-activated gold nanoparticles and biotinylated DL4-Fc to 1 μm SA-coated Dynabeads™ and 25 μm and 100 μm polystyrene beads (FIG. 2). Functionalized beads were incubated with 3T3-N1Cluc, which reports Notch activation using the luciferase gene as a reporter. The number of beads in each condition represented, in aggregate, the same total surface area and therefore, the same total number of DL4-Fc molecules. It was shown that the size of the beads affected the ability of DL4-Fc beads to activate Notch signaling, as shown by the levels of luciferase activity (FIG. 2B). Of note, DL4-μbeads of 25 μm diameter optimally enhanced the activation of Notch receptors when compared to other sized beads of the same material or to 1 μm Dynabeads and 50 nm nanoparticles.

Figure 3:
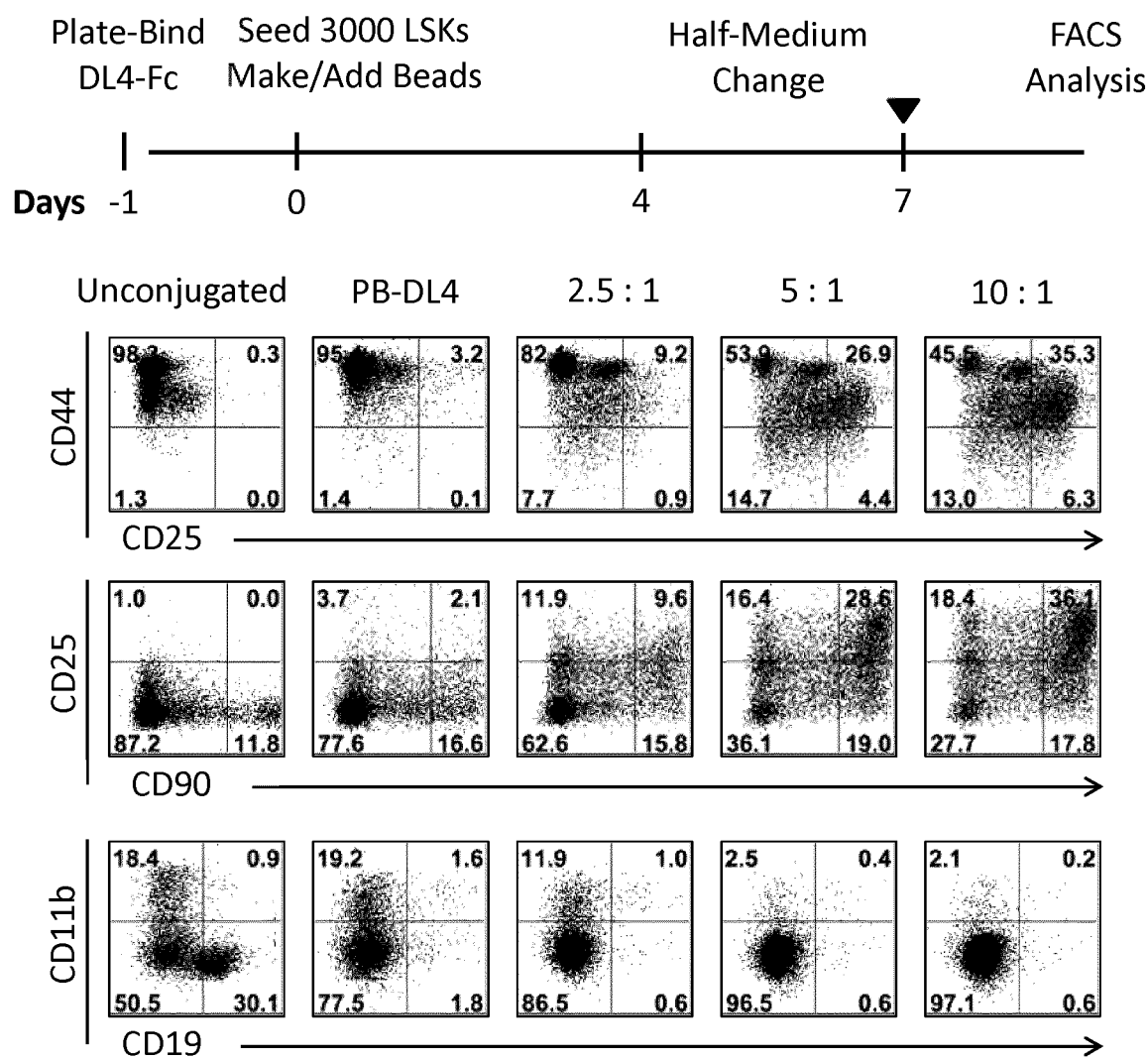
FIG. 3 shows induction of T cell development from mouse HSCs using $1^{st}$ generation DL4-µbeads. Mouse fetal liver derived HSPCs were incubated for 7 days with unconjugated µbeads or DL4-µbeads with media containing FBS, SCF, IL-7 and Flt3-L. Co-cultures were harvested and analyzed for the presence of T-lineage ($CD25^+$), B-lineage ($CD19^+$), or myeloid ($CD11b^+$) cells using flow cytometry. Numbers in plots indicate percentage of cells within each quadrant.

The level of Notch signaling achieved with 25 μm DL4-μbeads was higher than levels known to be required for the induction of T-lineage differentiation, which is equivalent to 20 μg/mL of plate-bound (PB) DL4-Fc. It was then determined whether DL4-μbeads, with the addition of IL-7, Flt3L, and SCF, have the ability to induce T cell development by incubating them with mouse HSCs for 7 days. The results showed that when incubated with DL4-μbeads, mouse HSCs readily gave rise to proT cells, as marked by the expression of CD25 on 41% of the cells (FIG. 3). In contrast, PB-DL4-Fc induced the expression of CD25 in only 4% of the cells. DL4-μbeads also inhibited the alternative B cell (CD19$^+$) and myeloid (CD11b$^+$) lineage outcomes that are known to be prevented by Notch signaling.

Figure 4:
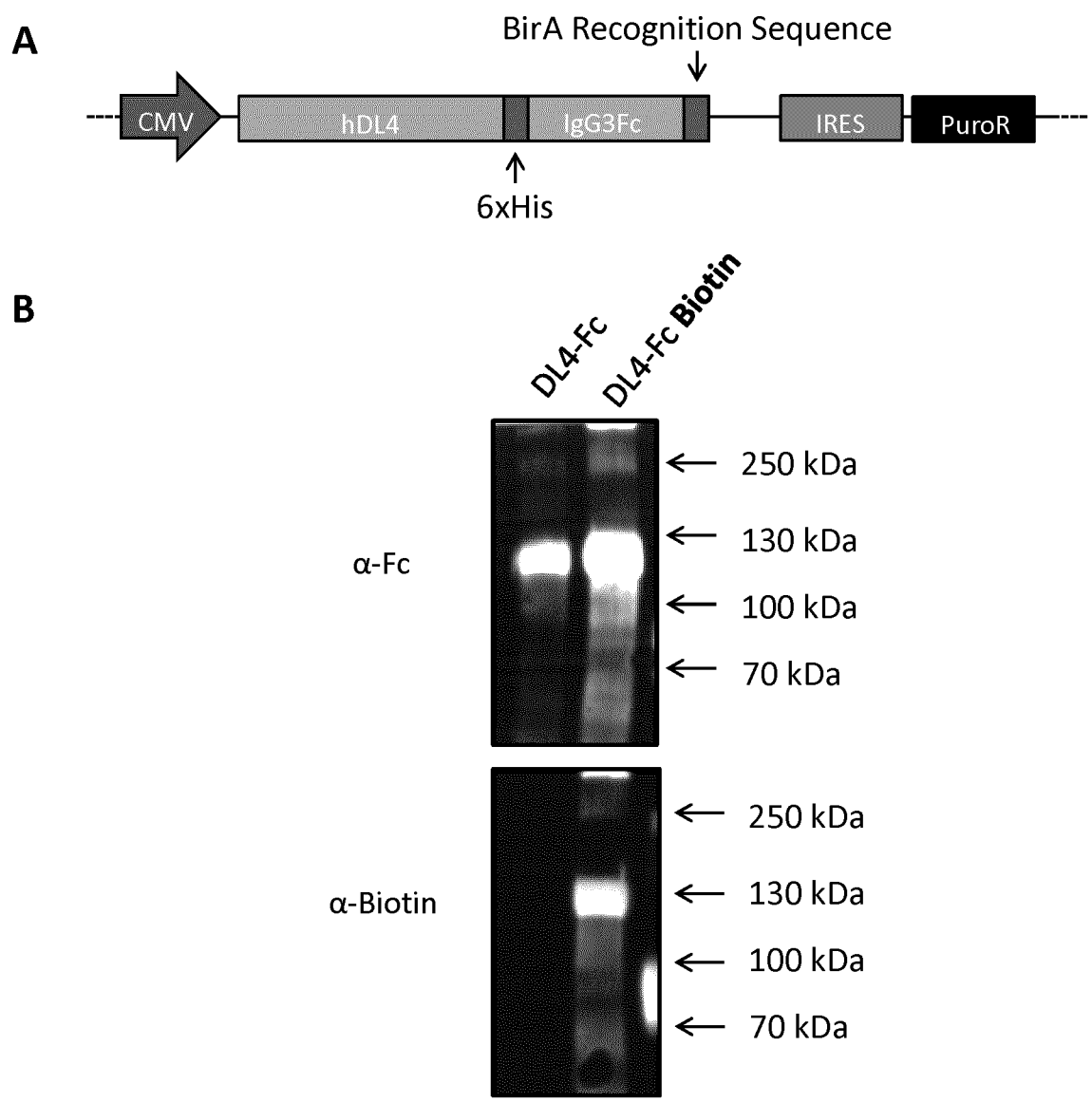
FIG. 4 shows site-specific biotinylation of DL4-Fc. A) DL4-Fc fusion construct was redesigned to include a BirA recognition sequence (AviTag™) at its C-terminus, to which a biotin moiety may be conjugated by the enzyme BirA. B) Western blot analysis of chemically biotinylated DL4-Fc using anti-human IgG (top) and anti-biotin (bottom) under reducing conditions.
Figure 5:
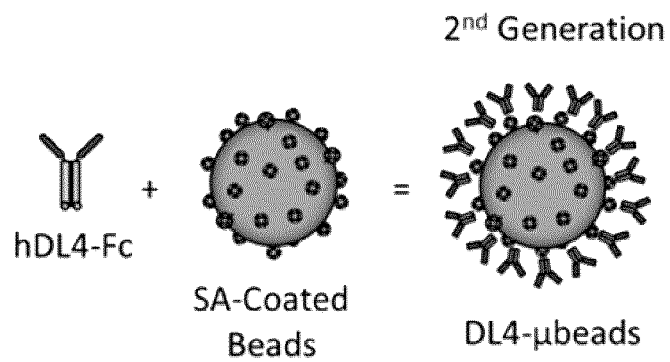
FIG. 5 shows differential capacity of $1^{st}$ and $2^{nd}$ generation DL4-µbeads to activate Notch. A) BirA-biotinylated DL4-Fc protein were conjugated to SA-coated beads to form directionally oriented $2^{nd}$ generation DL4-µbeads. B) $3\times10^4$ 3T3-N1Cluc cells were incubated on either IgG- or DL4-Fc plate-bound controls or with $1^{st}$ or $2^{nd}$ generation DL4-µbeads (25 µm). 24 h after plating, the cells were lysed and analyzed for luciferase activity.
Figure 5:
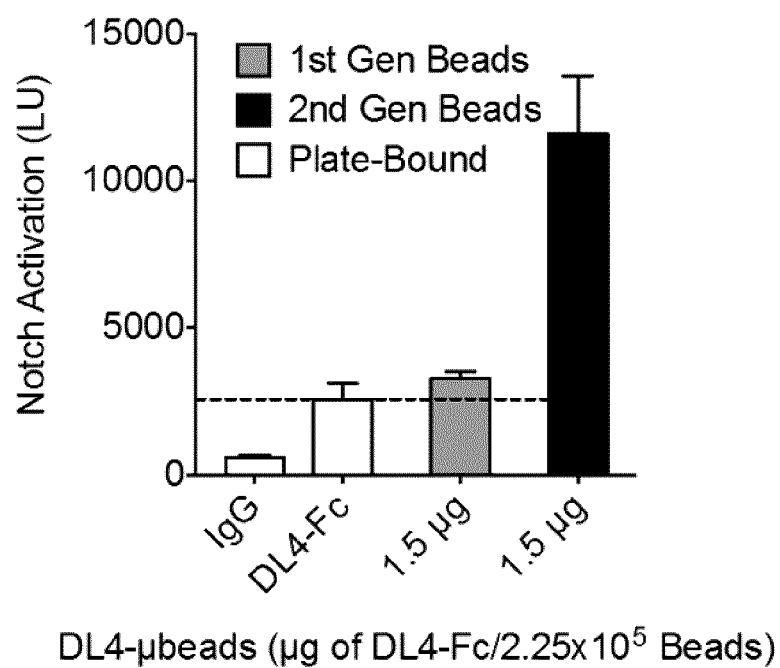
Figure 6:
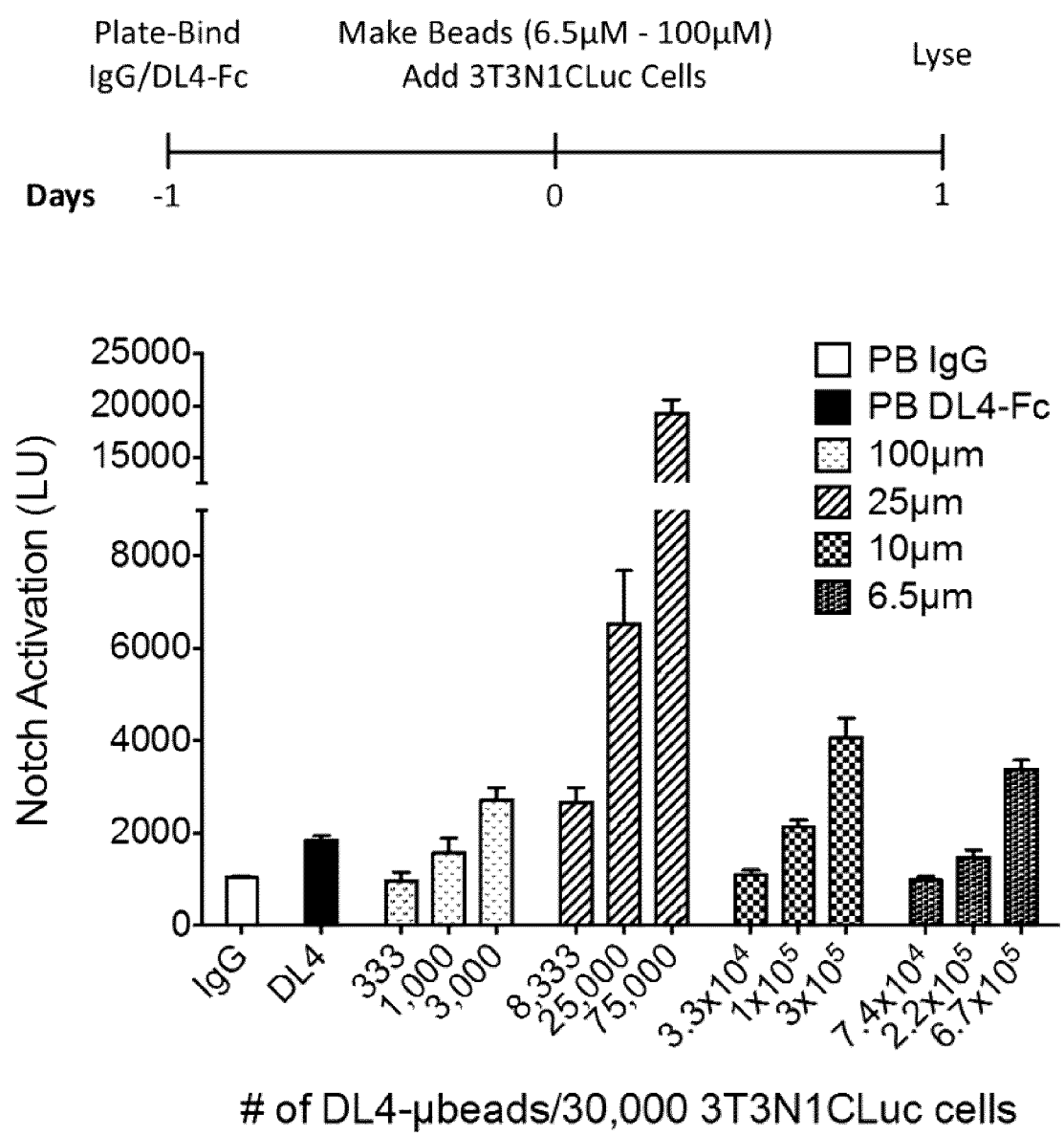
FIG. 6 shows an evaluation of the influence of µbead size on Notch activation. DL4-µbeads ranging in size from 6.5 µm to 100 µm were incubated overnight with $3\times10^4$ 3T3-

Directional Conjugation of DL4-Fc to μBeads Enhances the Induction of Notch Signaling To improve upon the randomly-oriented first-generation DL4-μbeads, the inventors investigated whether directing the orientation of DL4-Fc relative to bead surface would enhance the delivery of Notch signaling. To this end, the DL4-Fc was designed with a BirA recognition sequence (AviTag™) at its C-terminus, to which a single biotin molecule could be enzymatically conjugated (FIG. 4). Incubation of these second generation DL4-μbeads significantly increased levels of Notch signaling, as assessed by 3T3N1CLuc cells luciferase activity (FIG. 5). Using the directional method of conjugation, the influence of bead size on Notch delivery was reassessed. Results showed that 100 μm, 25 μm, 10 μm and 6.5 μm diameter beads all had the capacity to activate Notch, but the 25 μm diameter beads were the most effective (FIG. 6). The optimal ratio of beads to cells was also evaluated and it was determined that with a 3:1 ratio of beads to cells there was a 10-fold increase in Notch activation compared to plate-bound control (FIG. 6).

It was next investigated whether the SA μbeads were saturated with biotinylated DL4-Fc in order to determine the amount of DL4-Fc per bead that would optimally activate Notch signaling. Different amounts of DL4-Fc (0.01, 0.1, 1 and 10 μg) were incubated to the same number of 25 μm SA-beads. The beads were then incubated overnight with 3T3-N1Cluc cells. The results showed that 1 μg DL4-Fc per 2.25×10$^5$ SA-μbeads gave a maximal response, suggesting that the activity of DL4-μbeads was saturated (FIG. 7A). It was also demonstrated that magnetized 25 μm polystyrene beads (coated with iron oxide) are equally effective in activating Notch as their non-magnetized counterparts (FIG. 7A). In addition, substituting Protein G-μbeads for SA-μbeads of the same diameter did not make a significant difference in DL4-Fc's ability to activate Notch (FIG. 7B).

Thus, the results established the following parameters, i) the size of beads, ii) the orientation of DL4 molecules, and iii) the ratio of beads to cells. Optimizing these parameters had an influence on stimulation of Notch activity and in determining the optimal conditions for T cell development. In addition, a ratio of DL4-Fc to beads to obtain maximum activity with respect to DL4-Fc loading on beads was determined and that magnetizing the beads has no influence on Notch activity. Further, protein G-μbeads, which bind the Fc region of the DL4-Fc likely oriented DL4-Fc similarly to SA-μbeads.

DL4-μBeads Conditions to Maximize T Cell Development from HSPCs

Based on the results above, the inventors next set out to determine whether the same factors would influence T cell development. This was first tested using mouse HSPCs. As shown in FIG. 8, DL4-μbeads are more effective than PB-DL4 in inducing mouse T cell development.

To determine the optimal ratio of HSPCs to DL4-μbeads in order to maximize the generation of proT cells, $3\times10^3$ HSPCs were incubated for each condition while increasing DL4-μbeads number by a factor of 3 (FIG. 9). After 7 days of incubation, the differentiation of HSPCs into proT cells ($CD25^+$) was analyzed for different HSPC:DL4-μbead ratios. The optimal HSPC:DL4-μbead ratio appeared to be about 1:9, as this yielded the highest percentage $CD25^+$ cells. Increasing the HSPC:bead number ratio to 1:27 did not improve upon T-lineage differentiation.

Kinetics and Expansion of Human T Cell Development with DL4-μBeads

The use of DL4-μbeads to induce human T cell development from $CD34^+$ UCB-derived HSPCs was next validated. To this end, the above-established optimal HSPC:DL4-μbead ratio of 1:9 was used. Every 2 days, cells were counted and flow cytometry analysis was performed. The results showed the emergence of human proT cells co-expressing CD34, CD7 and CD5 by day 4 of culture (FIG. 10A). These results demonstrate a robust proT cell phenotype ($CD34^+CD7^+$ or $CD7^+CD5^+CD1a^-$) is reached by human HSPCs incubated with DL4-μbeads, but not with unconjugated μbeads or with PB-DL4-Fc, confirming the higher capacity of DL4-μbeads to activate Notch when compared to plate-bound DL4-Fc.

One challenge in attaining clinically relevant proT cell yield is the difficulty in obtaining sufficient cell numbers. To address this, cell expansion during development was also assessed and revealed that, by day 14, greater than a 150-fold total cell expansion over the initial starting number could be achieved (FIG. 10B).

DL4-μBeads Promote Mature Human T Cell Development

It was next investigated whether the increased capacity of DL4-μbeads to activate Notch could induce developing cells to differentiate into later stages of T cell development, and thus express a more mature phenotype at later culture time-points (FIG. 11). The analysis of both day 28 and day 47 cultures showed that $CD4^+$ $CD8^+$ double positive (DP) cells constituted about 25% of the cells. Interestingly, day 47 cultures showed the emergence of $CD4^+CD8^+CD3^+$ DP cells and $CD8^+CD3^+$ single positive (SP) cells. These results show that strong Notch signaling induced by DL4-μbeads can overcome the developmental roadblock for T cell maturation seen in previous attempts using PB-DL4-Fc.

Mobilized Peripheral Blood (mPB)-Derived HSPCs Differentiate into T Lineage Cells when Cultured with DL4-μBeads Adult mPB is potentially a more readily obtainable source of HSPCs than UCB, as the number of HSPCs obtained from an individual is about 100× that of a UCB. To compare the ontogeny of T lineage development, mPB-derived $CD34^+$ HSPCs from 3 different individuals were cultured with DL4-μbeads and compared to UBC-derived HSPC cultures (FIG. 12A). It was observed that, at D14, the progression of T cell development was very similar to that of CB-derived HSPCs with similar percentages of proT cell populations ($CD34^+CD7^+$). However, the rate of expansion after 14 days was at 110× for mPB-derived HSPCs, whereas it was close to 190× for CB-derived cells (FIG. 12B).

Induction of T Cell Development in iPSCs Using DL4-μBeads

Human iPSCs derived from fibroblasts were induced to differentiate into $CD34^+$ pre-hematopoietic precursor cells according to the Methods described herein. $CD34^+$ cells were incubated with DL4-μbeads to determine their capability to drive pluripotent cells toward T-lineage during early (FIG. 13A) and late stages (FIG. 13B) of development. Early stages of development show the normal gain of CD7 cell surface markers, followed by CD5. Late stages of T cell development are marked by the gain of $CD4^+$ immature single positive (iSP) marker on day 28 and single positive marker CD8 cells on D35. Of note is the presence of T cell receptor (TCR) component, CD3, a cell surface marker, indicating the presence of mature T cells in this culture.

When iPSCs are derived from a T cell (T-iPSC), it signifies that the TCRα and TCRβ loci have already been genetically rearranged and when re-differentiated to T lineage fate, the cells will express the already rearranged TCRαβ. To determine at what stage of development TCRβ would be expressed by T-iPSC-derived cells, $CD34^+$ pre-hematopoietic progenitor cells were incubated with DL4-μbeads. The culture examined at D12 showed cell surface expression of TCRαβ and CD3 in 40% of the cells, at the time when mature T cell markers CD4 and CD8 were not yet expressed, but 80% of the cells did express the early T cell marker CD7 (FIG. 14, left panels). When gated on $CD7^+$ cells, they exhibited over 70% TCRαβ and CD3 expression. On D24 over 80% of the cells expressed TCRαβ and CD3, and many of these cells had acquired expression of CD4 and CD8 (FIG. 14, right panels).

VCAM-1 Accelerated Differentiation of HSPCs to T Cells

To determine whether the SA-μbeads can function as a modular base for addition of other biotinylated molecules, the functional effect of VCAM-1 was examined. It had been previously shown that the addition of VCAM-1 to plate-bound DLL4, accelerated the differentiation of HSPCs to T cells (Shukla et al., 2017). Here, a new fusion protein, VCAM1-Fc, was genetically designed, expressed and biotinylated. Using immunoblot analysis, it was determined that the generated VCAM1-Fc is similar in size to that of a commercially available VCAM1 product (FIG. 15, left panel). In addition, VCAM1-Fc, which contains a target sequence for BirA enzyme biotinylation, was demonstrated to be biotinylated (FIG. 15, right panel). Biotinylated VCAM1-Fc was then used to coat the surface of SA-µbeads, along with an invariable amount of DL4-Fc, and cultured with UBC-derived HSPCs. D7 culture analysis demonstrated that, in general, higher VCAM1-Fc/DL4-Fc ratios resulted in accelerated rates of differentiation (FIG. 16). This demonstrated the activity of VCAM-1, as well as the flexibility of µbeads as a platform for controlled addition of costimulatory molecules involved in T cell development.

Progenitor T Cell Engraftment into Immunodeficient Mouse and its Subsequent Migration to the Periphery To assess the ability of $CD34^+$ $CD7^+$ progenitor T (proT) cells derived from HSPC/DL4-µbead cultures to engraft the thymus, the immunodeficient NSG mouse model was chosen. The production of proT cells was linearly scaled up, switching from 96-well plated to T25 flasks. ProT cells were sorted from D7 cultures and injected intrahepatically into NSG neonates. Early engraftment was examined at week 3, showing the presence of human $CD45^+$ cells, most of which are at the double positive $CD4^+$ $CD8^+$ (DP) mature T cell stage within the thymus (FIG. 17). Development of B (CD19) and myeloid (CD33) cells were absent in the thymus.

Week 12 post-transplant analysis showed that within the thymus, where no renewal of proT cells takes place, human CD45+ cells had almost all differentiated and matured into CD4 and CD8 SPs (FIG. 18). It appeared that mature CD4 and CD8 SPs had migrated out of the thymus and into the spleen, as well as the bone marrow. This demonstrated that proT cells had the capacity to mature within the thymus and normally migrate to secondary lymphoid organs.

Separation of µBeads from Cellular Component in the Culture

To prepare for scale up production of proT cells from HSPC/DL4-µbead coculture for clinical purposes, the ability of AutoMACS (Miltenyi) to separate the iron-oxide coated DL4-µbeads from the co-cultured cells was assessed (FIG. 19A). AutoMACS, which functions similarly to the clinically approved CliniMACS (Miltenyi), completely isolated the µbeads from the cellular component (FIG. 19B), as they could not be detected in the cellular fraction. In contrast, some cells were trapped or remained attached to isolated µbeads in the beads fraction.

SUMMARY

Here, the development of a cell-free bead-based system for the generation of T cells from both mouse and human HSPCs as well as iPSCs is described. Non-plate-bound or suspension Notch ligands, such as DL4-µbeads, represent a unique strategy to allow for the effective generation of T-lineage cells, which can be readily achieved in large-scale bioreactor-based suspension cultures, and potentially overcome the developmental roadblocks, plus the inefficiency and scalability drawbacks, associated with plate-bound approaches.

Previous studies have not demonstrated the generation of human T-lineage cells beyond the immature proT cell stage in a cell-free support system. In addition, results herein show for the first time the generation of T-lineage cells, including proT and mature SP CD4 and CD8 cells from iPSCs using a cell-free support culture system. Here, it is shown that the suspension Notch ligand culture system described herein allows for the emergence of mature SP T cells, showing that the Notch signaling achieved with the DL4-µbeads described herein could overcome the developmental roadblock for T cell maturation seen with plate-bound approaches.

REFERENCES

Awong, G., Herer, E., Surh, C. D., Dick, J. E., La Motte-Mohs, R. N., and Zuniga-Pflucker, J. C. (2009). Characterization in vitro and engraftment potential in vivo of human progenitor T cells generated from hematopoietic stem cells. Blood 114, 972-982.

Awong, G., Singh, J., Mohtashami, M., Maim, M., La Motte-Mohs, R. N., Benveniste, P. M., Serra, P., Herer, E., van den Brink, M. R., and Zuniga-Pflucker, J. C. (2013). Human proT-cells generated in vitro facilitate hematopoietic stem cell-derived T-lymphopoiesis in vivo and restore thymic architecture. Blood 122, 4210-4219.

D'Souza, B., Meloty-Kapella, L., and Weinmaster, G. (2010). Canonical and non-canonical Notch ligands. Curr Top Dev Biol 92, 73-129.

Ferrando, A. A., Neuberg, D. S., Staunton, J., Loh, M. L., Huard, C., Raimondi, S. C., Behm, F. G., Pui, C. H., Downing, J. R., Gilliland, D. G., et al. (2002). Gene expression signatures define novel oncogenic pathways in T cell acute lymphoblastic leukemia. Cancer Cell 1, 75-87.

Gordon, W. R., Zimmerman, B., He, L., Miles, L. J., Huang, J., Tiyanont, K., McArthur, D. G., Aster, J. C., Perrimon, N., Loparo, J. J., et al. (2015). Mechanical Allostery: Evidence for a Force Requirement in the Proteolytic Activation of Notch. Dev Cell 33, 729-736.

Kennedy, M., Awong, G., Sturgeon, C. M., Ditadi, A., LaMotte-Mohs, R., Zuniga-Pflucker, J. C., and Keller, G. (2012). T lymphocyte potential marks the emergence of definitive hematopoietic progenitors in human pluripotent stem cell differentiation cultures. Cell Rep 2, 1722-1735.

Krenger, W., Blazer, B. R., and Hollander, G. A. (2011). Thymic T-cell development in allogeneic stem cell transplantation. Blood 117, 6768-6776.

Legrand, N., Weijer, K., and Spits, H. (2006). Experimental models to study development and function of the human immune system in vivo. J Immunol 176, 2053-2058.

Meloty-Kapella, L., Shergill, B., Kuon, J., Botvinick, E., and Weinmaster, G. (2012). Notch ligand endocytosis generates mechanical pulling force dependent on dynamin, epsins, and actin. Dev Cell 22, 1299-1312.

Porter, D. L., and June, C. H. (2005). T-cell reconstitution and expansion after hematopoietic stem cell transplantation: 'T' it up! Bone Marrow Transplant 35, 935-942.

Schmitt, T. M., Ciofani, M., Petrie, H. T., and Zuniga-Pflucker, J. C. (2004). Maintenance of T cell specification and differentiation requires recurrent notch receptor-ligand interactions. J Exp Med 200, 469-479.

Shah, D. K., and Zuniga-Pflucker, J. C. (2014). An overview of the intrathymic intricacies of T cell development. J Immunol 192, 4017-4023.

Shukla, S., Langley, M. A., Singh, J., Edgar, J. M., Mohtashami, M., Zuniga-Pflucker, J. C., and Zandstra, P. W. (2017). Progenitor T-cell differentiation from hematopoietic stem cells using Delta-like-4 and VCAM-1. Nat Methods 14, 531-538.

Thompson, P. K., and Zuniga-Pflucker, J. C. (2011). On becoming a T cell, a convergence of factors kick it up a Notch along the way. Semin Immunol 23, 350-359.

van den Brink, M. R., Alpdogan, O., and Boyd, R. L. (2004). Strategies to enhance T-cell reconstitution in immunocompromised patients. Nat Rev Immunol 4, 856-867.

Weng, A. P., Ferrando, A. A., Lee, W., Morris, J. P. t., Silverman, L. B., Sanchez-Irizarry, C., Blacklow, S. C., Look, A. T., and Aster, J. C. (2004). Activating mutations of NOTCH1 in human T cell acute lymphoblastic leukemia. Science 306, 269-271.

Zakrzewski, J. L., Kochman, A. A., Lu, S. X., Terwey, T. H., Kim, T. D., Hubbard, V. M., Muriglan, S. J., Suh, D., Smith, O. M., Grubin, J., et al. (2006). Adoptive transfer of T-cell precursors enhances T-cell reconstitution after allogeneic hematopoietic stem cell transplantation. Nat Med 12, 1039-1047.

Zakrzewski, J. L., Suh, D., Markley, J. C., Smith, O. M., King, C., Goldberg, G. L., Jenq, R., Holland, A. M., Grubin, J., Cabrera-Perez, J., et al. (2008). Tumor immunotherapy across MHC barriers using allogeneic T-cell precursors. Nat Biotechnol 26, 453-461.

Zuniga-Pflucker, J. C. (2004). T-cell development made simple. Nat Rev Immunol 4, 67-72.

The invention claimed is:

1. A method of generating a population of progenitor T (proT) cells comprising culturing in suspension hematopoietic stem progenitor cells (HSPCs) with a Notch ligand conjugated to a suspension support in a non-conditioned medium to generate proT cells, wherein the Notch ligand is delta-like ligand 4 (DL4), and the suspension support is a particle or a microbead, wherein the non-conditioned medium is free of stromal cells, and wherein culturing the HSPCs with the Notch ligand conjugated to the suspension support inhibits the generation of CD19+ B lineage cells and CD11b+ myeloid cells.

2. The method of claim 1, wherein the HSPCs are human cells and the proT cells are characterized by $CD34^+CD7^+$ or $CD7^+CD5^+CD1a^-$.

3. The method of claim 2, wherein the HSPCs are mouse cells and the proT cells are characterized by $CD25^+$ or $CD2^+CD90^+$.

4. The method of claim 1, further comprising isolating proT cells from the non-conditioned medium.

5. The method of claim 3, wherein the HSPCs are CD117+ Sca-1+ mouse cells.

* * * * *